US012194608B2

(12) United States Patent
Almqvist et al.

(10) Patent No.: US 12,194,608 B2
(45) **Date of Patent: *Jan. 14, 2025**

(54) HAND-HELD ELECTRICALLY POWERED WORK TOOL

(71) Applicant: HUSQVARNA AB, Huskvarna (SE)

(72) Inventors: Torbjörn Almqvist, Gothenburg (SE); Paul Johansson, Torslanda (SE); Hanna Olsson, Kungsbacka (SE); Robert Lerbro, Floda (SE); Pär Carlsson, Hyssna (SE)

(73) Assignee: HUSQVARNA AB, Huskvarna (SE)

( * ) Notice: Subject to any disclaimer, the term of this patent is extended or adjusted under 35 U.S.C. 154(b) by 289 days.

This patent is subject to a terminal disclaimer.

(21) Appl. No.: 17/603,350

(22) PCT Filed: Oct. 1, 2020

(86) PCT No.: PCT/EP2020/077590
§ 371 (c)(1),
(2) Date: Oct. 13, 2021

(87) PCT Pub. No.: WO2021/104723
PCT Pub. Date: Jun. 3, 2021

(65) Prior Publication Data

US 2022/0193879 A1 Jun. 23, 2022

(30) Foreign Application Priority Data

Nov. 25, 2019 (SE) .................................... 1951339-9
Nov. 25, 2019 (SE) .................................... 1951340-7
(Continued)

(51) Int. Cl.
*B25F 5/00* (2006.01)
*B25F 5/02* (2006.01)

(52) U.S. Cl.
CPC .............. *B25F 5/006* (2013.01); *B25F 5/008* (2013.01); *B25F 5/02* (2013.01)

(58) Field of Classification Search
CPC . B25F 5/006; B25F 5/008; B25F 5/02; H02K 5/24; H02K 5/207; H02K 9/04; H02J 7/0063
(Continued)

(56) References Cited

U.S. PATENT DOCUMENTS 3,643,385 A 2/1972 Mikiya
4,383,013 A * 5/1983 Bindin ................ H01M 10/637 429/104
(Continued)

FOREIGN PATENT DOCUMENTS

CN 205993049 U 3/2017
CN 110126968 A 8/2019
(Continued)

OTHER PUBLICATIONS

Search Report and Office Action for Swedish Application No. 1951339-9 mailed Aug. 5, 2020.
(Continued)

*Primary Examiner* — Robert F Long
(74) *Attorney, Agent, or Firm* — Burr & Forman LLP

(57) ABSTRACT

A hand-held work tool (100) comprising a first part (110) and a second part (120) arranged vibrationally isolated from each other, the first part (110) comprising an interface for holding a circular cutting tool (130) and an electric motor (140) arranged to drive the circular cutting tool, wherein the electric motor (140) is arranged to drive a fan (145) configured to generate a flow of cooling air for cooling the electric motor (140), the second part (120) comprising a battery compartment (150) for holding an electrical storage device arranged to power the electric motor (140), wherein
(Continued)

a cooling air conduit is arranged to guide a portion of the flow of cooling air (160) from the first part (110) and into the second part (120) for cooling the electrical storage device.

23 Claims, 14 Drawing Sheets

(30) Foreign Application Priority Data

Nov. 25, 2019 (SE) .................................... 1951341-5
Nov. 25, 2019 (WO) ................. PCT/SE2019/051196

(58) Field of Classification Search
USPC ........ 173/197, 81, 90, 140–141, 162.1, 213, 173/168–171
See application file for complete search history.

(56) References Cited

U.S. PATENT DOCUMENTS

| | | | | |
|---|---|---|---|---|
| 5,006,740 | A | 4/1991 | Palm | |
| 5,600,542 | A | 2/1997 | Malgouires | |
| 5,632,578 | A | 5/1997 | McCurry et al. | |
| 6,314,922 | B1 | 11/2001 | Zimmermann et al. | |
| 6,543,549 | B1 * | 4/2003 | Riedl | B25F 5/02 173/171 |
| 6,571,788 | B1 * | 6/2003 | Goldstein | A47J 37/079 126/25 B |
| 6,894,893 | B2 | 5/2005 | Hidesawa | |
| 7,121,854 | B2 | 10/2006 | Buck et al. | |
| 7,858,219 | B2 | 12/2010 | Agehara et al. | |
| 8,430,182 | B2 | 4/2013 | Soika et al. | |
| 9,221,111 | B2 | 12/2015 | Elfner et al. | |
| 9,871,424 | B2 * | 1/2018 | Tadokoro | B25F 5/008 |
| 2002/0034682 | A1 * | 3/2002 | Moores, Jr. | H02J 7/0044 429/71 |
| 2004/0124721 | A1 * | 7/2004 | Pfisterer | H02K 11/33 310/58 |
| 2005/0168939 | A1 * | 8/2005 | Iijima | F28D 1/05375 361/679.48 |
| 2007/0031248 | A1 | 2/2007 | Hsu et al. | |
| 2007/0240313 | A1 | 10/2007 | Layher et al. | |
| 2008/0290745 | A1 | 11/2008 | Riedl | |
| 2008/0302552 | A1 * | 12/2008 | Kondo | B25F 5/006 173/217 |
| 2009/0213546 | A1 * | 8/2009 | Hassani | H01L 23/473 361/702 |
| 2009/0245958 | A1 | 10/2009 | Lau et al. | |
| 2010/0200260 | A1 * | 8/2010 | Mikami | B25C 1/04 173/217 |
| 2011/0006621 | A1 | 1/2011 | Lau | |
| 2012/0302147 | A1 | 11/2012 | Trautner et al. | |
| 2014/0154532 | A1 * | 6/2014 | Chellew | B25F 5/02 429/7 |
| 2014/0262400 | A1 * | 9/2014 | Berger | E01C 19/262 173/148 |
| 2014/0318821 | A1 | 10/2014 | Wyler et al. | |
| 2017/0071134 | A1 | 3/2017 | Li et al. | |
| 2018/0099393 | A1 | 4/2018 | Iida et al. | |
| 2019/0291157 | A1 * | 9/2019 | Fuentes | B21D 1/10 |
| 2019/0305640 | A1 | 10/2019 | Duernegger | |
| 2022/0193879 | A1 * | 6/2022 | Almqvist | B25F 5/008 |
| 2022/0314422 | A1 * | 10/2022 | Karlsson | H01M 50/247 |

FOREIGN PATENT DOCUMENTS

| | | | | | |
|---|---|---|---|---|---|
| DE | 102016106559 | A1 | | 10/2017 | |
| DE | 102019207122 | A1 | | 11/2019 | |
| EP | 0940864 | A2 | | 9/1999 | |
| EP | 1564808 | A1 | * | 8/2005 | G06F 1/203 |
| EP | 2000267 | A2 | | 12/2008 | |
| EP | 2404708 | A2 | | 1/2012 | |
| EP | 2431132 | A2 | | 3/2012 | |
| EP | 2747949 | A1 | * | 7/2014 | A01G 3/053 |
| EP | 2747949 | B1 | | 11/2017 | |
| FR | 2254943 | A5 | | 7/1975 | |
| GB | 2319669 | A | | 5/1998 | |
| GB | 2352997 | A | | 2/2001 | |
| GB | 2423420 | A | * | 8/2006 | B25F 5/008 |
| GB | 2432036 | A | | 5/2007 | |
| JP | H662637 | A | | 3/1994 | |
| JP | H09226382 | A | | 9/1997 | |
| JP | 11213970 | A | | 8/1999 | |
| JP | 2007-125691 | A | | 5/2007 | |
| JP | 2007320004 | A | | 12/2007 | |
| JP | 2010114063 | A | * | 5/2010 | H01M 10/613 |
| JP | 2014-148011 | A | | 8/2014 | |
| JP | 2014151415 | A | | 8/2014 | |
| JP | 2015013369 | A | | 1/2015 | |
| JP | 2015-164769 | A | | 9/2015 | |
| JP | 2017-99079 | A | | 6/2017 | |
| JP | 2018187699 | A | | 11/2018 | |
| TW | 201208813 | A | | 3/2012 | |
| WO | 2009145206 | A2 | | 12/2009 | |
| WO | 20130/32372 | A1 | | 3/2013 | |
| WO | 2013062457 | A1 | | 5/2013 | |
| WO | 2014062105 | A1 | | 4/2014 | |
| WO | 2014126017 | A1 | | 8/2014 | |
| WO | WO-2016087341 | A1 | * | 6/2016 | B25D 11/00 |
| WO | 2017159201 | A1 | | 9/2017 | |
| WO | 2018180084 | A1 | | 10/2018 | |
| WO | 2020043707 | A1 | | 3/2020 | |

OTHER PUBLICATIONS

Search Report and Office Action for Swedish Application No. 1951340-7 mailed Aug. 5, 2020.
Search Report and Office Action for Swedish Application No. 1951341-5 mailed Aug. 5, 2020.
International Search Report and Written Opinion for International Application No. PCT/SE2019/051196 mailed Aug. 5, 2020.
International Search Report and Written Opinion for International Application No. PCT/EP2020/077590 mailed Dec. 17, 2020.

* cited by examiner

HAND-HELD ELECTRICALLY POWERED WORK TOOL

TECHNICAL FIELD

The present disclosure relates to electrically powered hand-held work equipment such as cut-off tools and saws for cutting concrete and stone.

BACKGROUND

Hand-held work tools for cutting and/or abrading hard materials such as concrete and stone comprise powerful motors in order to provide the required power for processing the hard materials. These motors generate a substantial amount of heat and therefore need to be cooled in order to prevent overheating. Electrical work tools generate heat by the electrical motor, and also by the battery and control electronics. There is a need for efficient methods of cooling such work tools.

The work tools also normally generate vibration which may be harmful or at least cause discomfort to an operator of the tool. It is desired to protect the operator from prolonged exposure to strong vibration.

The environments in which these types of tools are used are often harsh. The work tools are exposed to water, dust, debris, and slurry, which may affect tool performance negatively. For instance, slurry may accumulate in the work tool interior where it eventually causes tool failure. It is desired to prevent accumulation of dust and slurry in the work tool interior.

Ease of operation is especially important for work tools used on construction sites. For electrical work tools, it is desirable that in-field battery change can be made in an efficient and convenient manner where the battery is easy to insert in the work tool, where the battery is snugly held in the work tool, and where the battery is easily released from the work tool.

To summarize, there are challenges associated with hand-held work tools.

SUMMARY

It is an object of the present disclosure to provide improved hand-held work tools which address the above-mentioned issues. This object is at least on part obtained by a hand-held work tool comprising a first part and a second part arranged vibrationally isolated from each other. The first part comprises an interface for holding a cutting tool and an electric motor arranged to drive the cutting tool. The electric motor is arranged to drive a fan configured to generate a flow of cooling air for cooling the electric motor. The second part comprises a battery compartment for holding an electrical storage device arranged to power the electric motor. A cooling air conduit is arranged to guide a portion of the flow of cooling air from the first part and into the second part for cooling the electrical storage device.

The main vibration generating parts of the work tool are comprised in the first part. Thus, by vibrationally isolating the first part from the second part, the amount of vibration propagating to the second part is significantly reduced. The second part may, e.g., comprise front and rear handles which are then vibrationally isolated from the vibration sources in the first part. Since vibration is reduced, an operator may use to tool longer and with an increased comfort-level. A single fan unit is used to cool both the electric motor and the electrical energy source. This is an advantage since there is no need for a second fan unit arranged in the second part. Efficient cooling of both the electric motor and of the electrical energy source is provided.

According to aspects, the fan comprises an axial fan portion arranged peripherally on the fan and a radial fan portion arranged centrally on the fan. The axial fan portion is arranged to generate the flow of cooling air for cooling the electric motor, and the radial fan portion is arranged to generate the portion of the flow of cooling air from the first part and into the second part for cooling the electrical storage device. This way the portion of cooling air guided into the second part is not first heated by the electric motor, which improves the cooling effect. Also, the radial fan is better when it comes to pushing air flows though the conduit to the second part, which may comprise bends and narrow sections.

The fan may be assembled in a fan housing comprising at least one opening arranged peripherally in the housing for receiving the flow of cooling air for cooling the electric motor, and a fan scroll arranged centrally in the housing for guiding the portion of the flow of cooling air from the first part and into the second part for cooling the electrical storage device. This way the portion of the flow of cooling air from the first part and into the second part is efficiently pushed into the second part, which improves the cooling effect.

According to some aspects, the portion of the flow of cooling air guided from the first part and into the second part passes via a bellows or other flexible air flow conduit arranged in-between the first and the second parts. The flexible air flow conduit provides a connection between the first part and the second part which is able to withstand vibration, and which does not forward significant level of vibration from the first part to the second part. Other possible flexible air flow conduits may, e.g., comprise rubber or plastic hoses, and jointed sectioned conduits able to flex in two or more directions.

According to some other aspects, the bellows comprises a poka-yoke feature comprising at least one protrusion configured to enter a corresponding recess formed in the first part and/or in the second part, thereby preventing erroneous assembly of the bellows with the first and second parts. The poka-yoke feature prevents erroneous assembly, leading to a more efficient and less error prone assembly process, which is an advantage.

According to some further aspects, the bellows or other flexible air flow conduit comprises at least one edge portion of increased thickness, wherein each edge portion is arranged to enter a corresponding groove formed in the first part or in the second part, thereby fixing the bellows in relation to the first or second part. This arrangement provides a secure attachment between the bellows and the work tool body and is also easily assembled.

According to aspects, the bellows is arranged with a shape that is symmetric about a symmetry plane parallel to an extension direction of the edge portions.

The symmetric shape simplifies assembly since the bellows need not be turned in any specific way before assembly.

According to aspects, the portion of the flow of cooling air from the first part and into the second part is arranged to pass a control unit of the hand-held work tool. This way the control unit is also cooled by the portion of the flow of cooling air, which is an advantage since there is no need for a separate cooling fan or the like for cooling the control unit. The control unit cooling may be further improved by arranging a cooling flange in connection to the control unit.

According to some aspects, the first part comprises a belt guard configured to enclose an interior space. A portion of the flow of cooling air is arranged to be guided into the interior space, thereby increasing an air pressure in the belt guard interior space above an ambient air pressure level.

This way water, dust, debris, and slurry is at least in part prevented from entering an interior of the work tool where it may accumulate to eventually cause work tool failure. It is an advantage that the build-up of dust and debris in the work tool interior is reduced.

According to some other aspects, the first part comprises a thermally conductive support arm arranged to support the circular cutting tool on a first end of the support arm, and to support the electric motor by a support surface at a second end of the support arm opposite to the first end, wherein the support arm comprises one or more cooling flanges arranged to conduct heat away from the electric motor via the support surface. The cooling flanges improve heat dissipation from the electric motor via the support arm, which is an advantage. The support surface improves a thermal coupling between the electric motor and the support arm, thereby improving heat dissipation from the electric motor, which is an advantage.

According to some further aspects, the support arm is arranged to enclose the electric motor at least partially. The support arm thereby protects the electric motor and also has the function of transporting heat away from the electric motor.

According to aspects, the support arm and the electric motor are at least partially integrally formed. This means that the support arm and the electric motor may share some parts. For instance, a part of the electric motor housing may be formed by the support arm material. This part may, e.g., be a motor gable.

According to aspects, at least 30% of a volume of the electric motor is enclosed by the support arm. Thus, the electric motor is significantly embedded into the support arm, thereby providing both improved motor protection and heat transport.

According to aspects, the battery compartment comprises a battery lock mechanism, the battery lock mechanism comprising a locking member rotatably supported on a shaft, the locking member comprising a leading edge portion arranged to enter a recess formed in the electrical energy source to lock the electrical energy source in position. The leading edge portion has an arcuate form with a curvature corresponding to that of a circle segment with radius corresponding to the distance from the leading edge portion to the center of the shaft. The recess formed in the energy source comprises a surface arranged to engage the leading edge portion, wherein the surface has an arcuate form configured to match that of the leading edge portion.

This battery lock mechanism allows for inserting a battery into the battery compartment in an effortless manner. The battery lock mechanism then securely holds the battery in position until it is to be removed. The arcuate form of the leading edge portion and the matching surface in the recess allows for a convenient release of the battery from the battery compartment.

According to some aspects, the battery compartment comprises at least one resilient member arranged to urge the electrical energy source into the locking position, wherein the at least one resilient member and the locking member are arranged at opposite sides of the battery compartment.

The at least one resilient member biases the battery into the locked position, thereby providing a more secure fastening of the battery. Also, by arranging the resilient member and the locking mechanisms on opposite sides, a twisting motion by the battery in relation to the battery compartment is obtained, similar to a stuck desk drawer which further secures the battery in the battery compartment.

According to some aspects, the locking member is spring biased towards the locking position, and operable by means of a lever or push-button mechanism. The biasing allows for an at least partly automatic locking function, while the lever or push-button mechanism can be conveniently operated by a user of the tool, which is an advantage.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
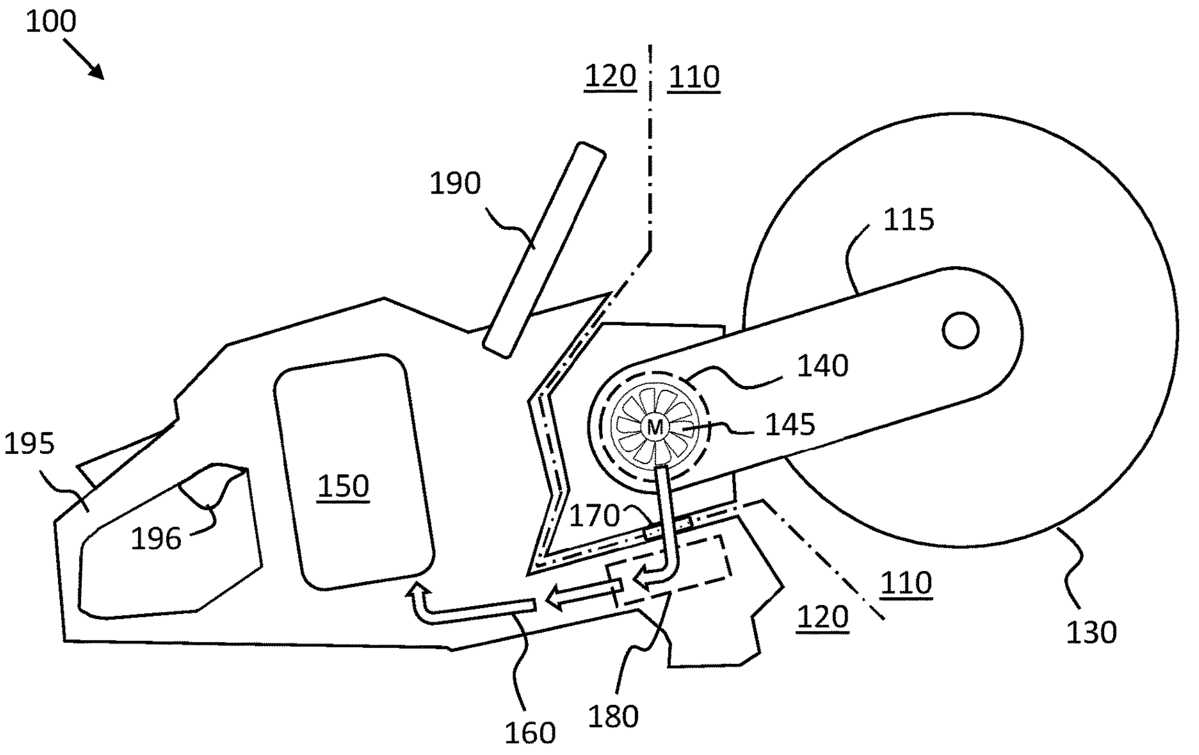
FIG. 1 shows an example work tool.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows a hand-held work tool 100. The work tool 100 in FIG. 1 comprises a rotatable circular cutting tool 130, but the techniques disclosed herein can also be applied to other cutting tools such as chain-saws, core drills, and the like. An electric motor 140 is arranged to drive the cutting tool. This motor is powered from an electrical energy storage device which is arranged to be held in a battery compartment 150.

The electrical motor generates a substantial amount of heat during operation. To prevent the motor from overheating, a fan 145 is arranged to be driven by the motor 140. This fan may, e.g., be attached directly to the motor axle, or by some means of transmission arrangement. The fan generates an airflow which transports heat away from the electric motor, thereby cooling the motor.

The work tool 100 is arranged to be held by a front handle 190 and a rear handle 195 and operated by a trigger 196 in a known manner. It is desirable to minimize vibration in the handles and trigger, since excessive vibration may be uncomfortable for an operator using the work tool 100. Excessive vibration may also reduce the lifetime of tool components such as cable connections and electronics. To reduce these vibrations, the work tool 100 comprises a first part 110 and a second part 120 arranged vibrationally isolated from each other. The first part 110 comprises an interface for holding the cutting tool 130 and also comprises the electric motor 140 arranged to drive the cutting tool. Thus, the first part comprises the main vibration generating elements of the work tool.

Notably, the second part 120 comprises the handles 190, 195 and the trigger 196 and therefore is the part which interfaces with the operator of the work tool 100. The second part 120 also comprises the battery compartment 150 for holding the electrical storage device, and the control electronics for controlling various operations of the work tool 100.

Since vibration generated in the first part 110 is not transferred, or at least not transferred in a significant amount, to the second part 120, an operator of the device 100 will not be subjected to the vibration, which is an advantage since he or she may be able to work for a longer period of time under more comfortable work conditions.

Vibration is normally measured in units of $m/s^2$, and it is desired to limit tool vibration in front and rear handles below 2.5 $m/s^2$. Tool vibration, guidelines for limiting tool vibration, and measurement of the tool vibration are discussed in "VIBRATIONER—Arbetsmiljöverkets föreskrifter om vibrationer samt allmänna råd om tillämpningen av föreskrifterna", Arbetsmiljöverket, AFS 2005:15.

According to some aspects, the work tool 100 comprises a first part 110 and a second part 120 arranged vibrationally isolated from each other by a vibration isolation system arranged to limit front and rear handle vibration to values below 2.5 $m/s^2$.

A cooling air conduit is arranged to guide a portion of the flow of cooling air 160 from the first part 110 and into the second part 120 for cooling the electrical storage device. This means that the fan 145 is used to cool both the electrical motor 140, and the electrical energy source, which is an advantage since only a single fan is needed.

Herein, a conduit is a passage arranged to guide a flow, such as a flow of air. A cooling air conduit may be formed as part of an interior space enclosed by work tool body parts, or as a hose of other type of conduit, or as a combination of different types of conduits.

Any control electronics comprised in the second part 120 may also be arranged to be cooled by the portion of the flow of cooling air 160 which is guided from the first part 110 and into the second part 120. FIG. 1 schematically shows a cooling flange 180 associated with such control electronics, which cooling flange 180 is optional, i.e., the portion of the flow of cooling air can be used to cool the control unit directly in which case the control unit constitutes the cooling flange. Thus, optionally, the portion of the flow of cooling air 160 from the first part 110 and into the second part 120 is arranged to pass a cooling flange 180 associated with a control unit of the hand-held work tool 100.

It may be a challenge to efficiently guide the portion of air 160 from the first part and into the second part, at least partly since the first part and the second part are arranged vibrationally isolated from each other. Some aspects of the disclosed work tool solve this challenge by providing bellows or some other type of flexible air flow conduit between the first part and the second part to guide the portion of air from the fan 145 towards the battery compartment 150. These bellows 170 will be discussed in more detail below in connection to FIGS. 4-6. Bellows are sometimes also referred to as flexible covers, convolutions, accordions, or machine way covers. A hose formed in a flexible material may be used instead of the bellows.

To summarize, FIG. 1 schematically illustrates a hand-held work tool 100 comprising a first part 110 and a second part 120 arranged vibrationally isolated from each other. According to some aspects, the first part 110 is vibrationally isolated from the second part 120 by one or more resilient elements.

The hand-held work tool may be a cut-off tool as shown in FIG. 1, but it can also be a chain saw or other work tool for cutting hard materials. The first part comprises an interface for holding a cutting tool 130 and an electric motor 140 arranged to drive the cutting tool. The drive arrangement may, e.g., comprise a belt drive or a combination of belt drive and geared transmission. The electric motor 140 is arranged to drive a fan 145 configured to generate a flow of cooling air for cooling the electric motor 140. The fan may, e.g., be directly connected to the electric motor shaft, or it can be indirectly connected to the motor shaft via some sort of transmission or drive arrangement, like a belt drive or a geared transmission.

The second part 120 comprises a battery compartment 150 for holding an electrical storage device arranged to power the electric motor 140, and a cooling air conduit is arranged to guide a portion of the flow of cooling air 160 from the first part 110 and into the second part 120 for cooling the electrical storage device. The electrical energy source may be a battery, or some type of fuel-cell or the like.

Figure 2A:
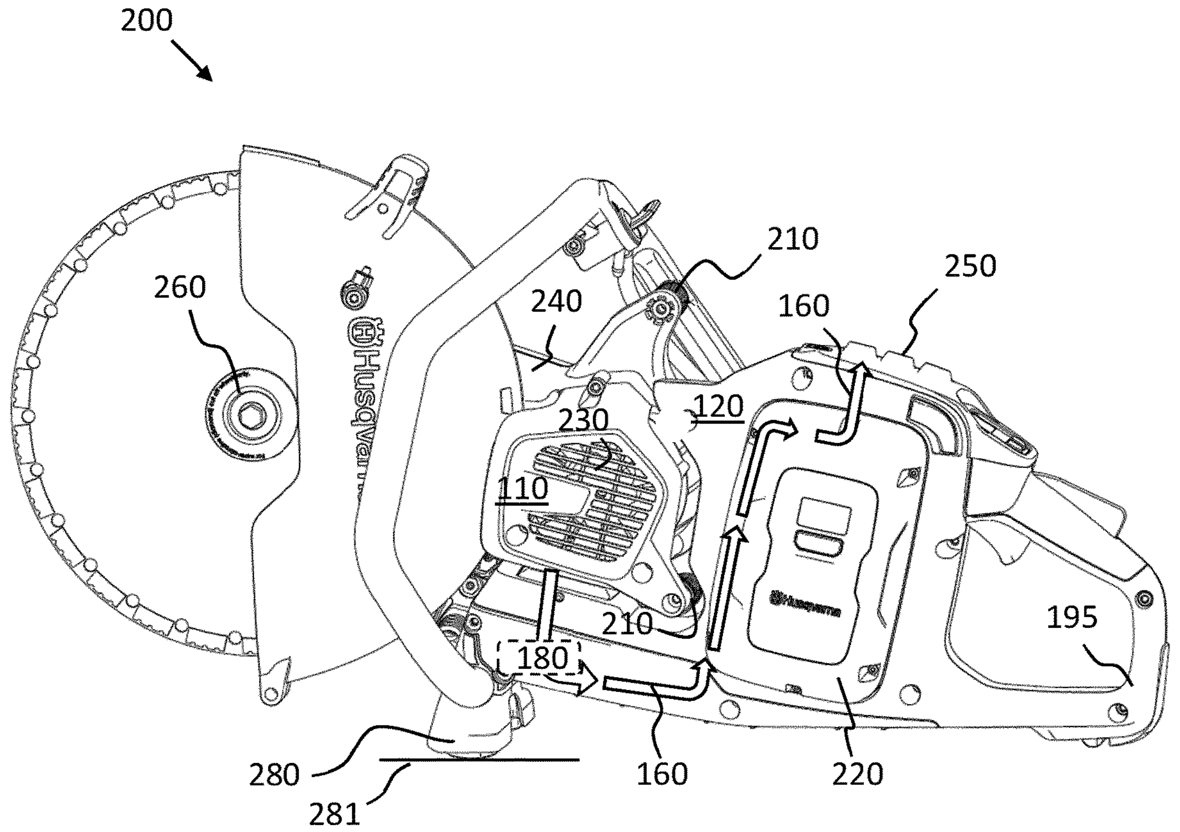
FIGS. 2A-C show views of another example work tool.
Figure 2B:
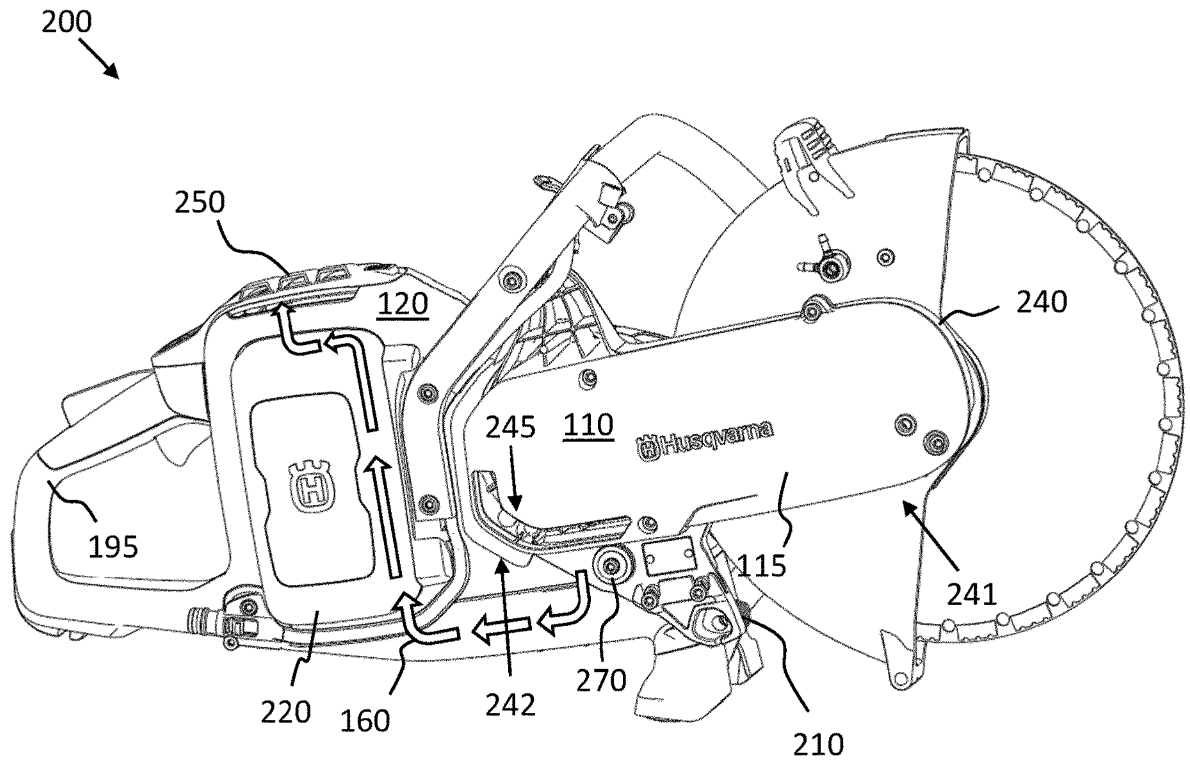
Figure 2C:
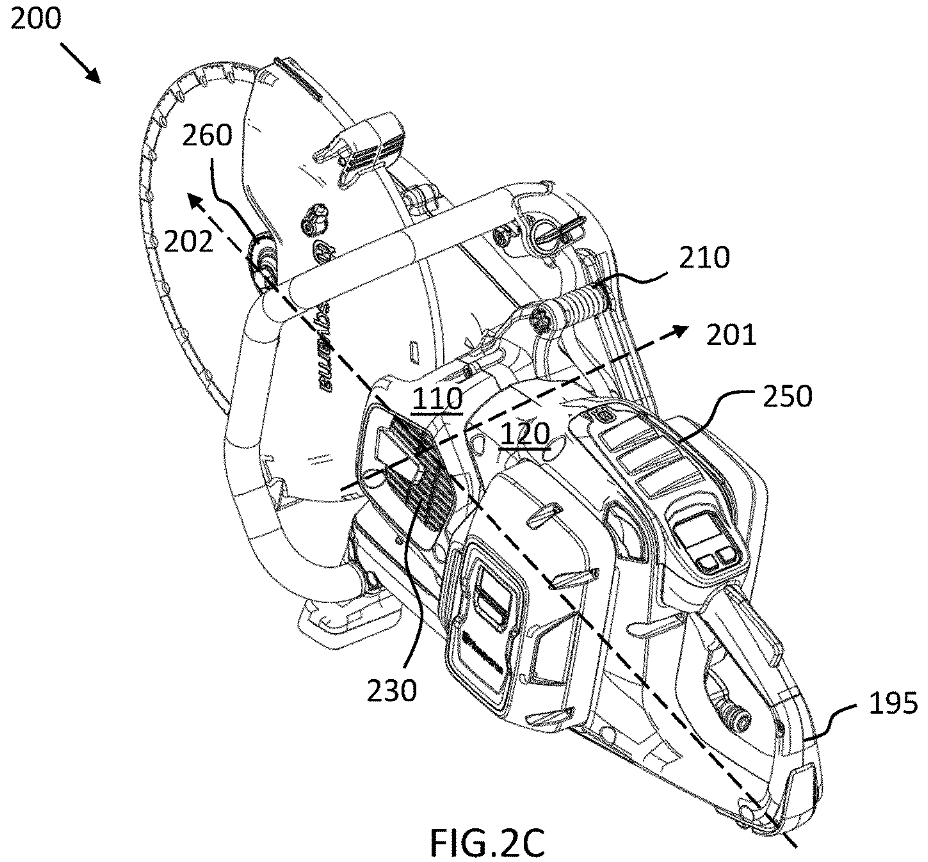

FIGS. 2A-C show different views of an example hand-held work tool 200 arranged to hold a cutting tool by a cutting tool interface 260. The resilient elements separating the first part 110 from the second part 120 are here compression springs 210. However, as mentioned above, some type of resilient material members, such as rubber bushings, may also be used as an alternative to the springs or in combination with the springs. Leaf springs may also be an option for vibrationally isolating the first part 110 from the second part 120.

FIG. 2B shows a holder 270 for an extra blade bushing. Cutting blades may have varying dimensions when it comes to the central hole in the blade. Some blade holes are 20 mm across, while some other holes are 25.5 mm across. There are even some markets where blade central holes of 30.5 mm are common. To allow use with different types of blades, having different dimensions on the central blade hole, the hand-held work tool 200 comprises a holder 270 arranged on the work tool body for holding a blade bushing. This extra blade bushing preferably has a different dimension compared to the blade bushing mounted in connection to the cutting tool interface 260.

FIG. 2A shows an example electrical storage device 220, here a battery, fitted in the battery compartment 150. This battery may be held in position by means of a battery lock mechanism which will be discussed in more detail below in connection to FIGS. 7A-C, 8, and 9.

According to some aspects, the flow of cooling air for cooling the electric motor 140 extends transversally 230, 245, 201 through the hand-held work tool, with respect to an extension plane of the circular cutting tool 130. Here, with reference to FIG. 2C, transversally is to be interpreted relative to an extension direction 202 of the work tool extending from the rear handle 195 towards the cutting tool and in relation to an extension plane of the cutting tool 130 (which is more or less vertical in FIG. 2C). Air from the environment is sucked into the work tool interior via an air intake 230 on one side of the tool and at least partly pushed out from the work tool interior via a first air outlet 245 on the other side of the tool formed in a direction transversal from the air intake 230.

A portion of the air flow sucked into the work tool via the air inlet 230 is guided via an air conduit into the second part 120 where it is used to cool the electrical storage device and optionally also cool portions of electrical control circuitry. With reference to, e.g., FIG. 2B, this portion of the air flow is guided downwards from the fan and then backwards in the tool towards the battery compartment 150 before it exits the work tool via a second air outlet 250 formed in the second part 120 of the tool.

It is appreciated that the air flow can be directed also in the reverse direction if the fan is run in reverse. I.e., the air outlets 245, 250 can also be used to suck cool air from the environment into the work tool 100, 200, and the air intake 230 can be re-purposed to instead allow hot air to exit the work tool.

Figure 10A:
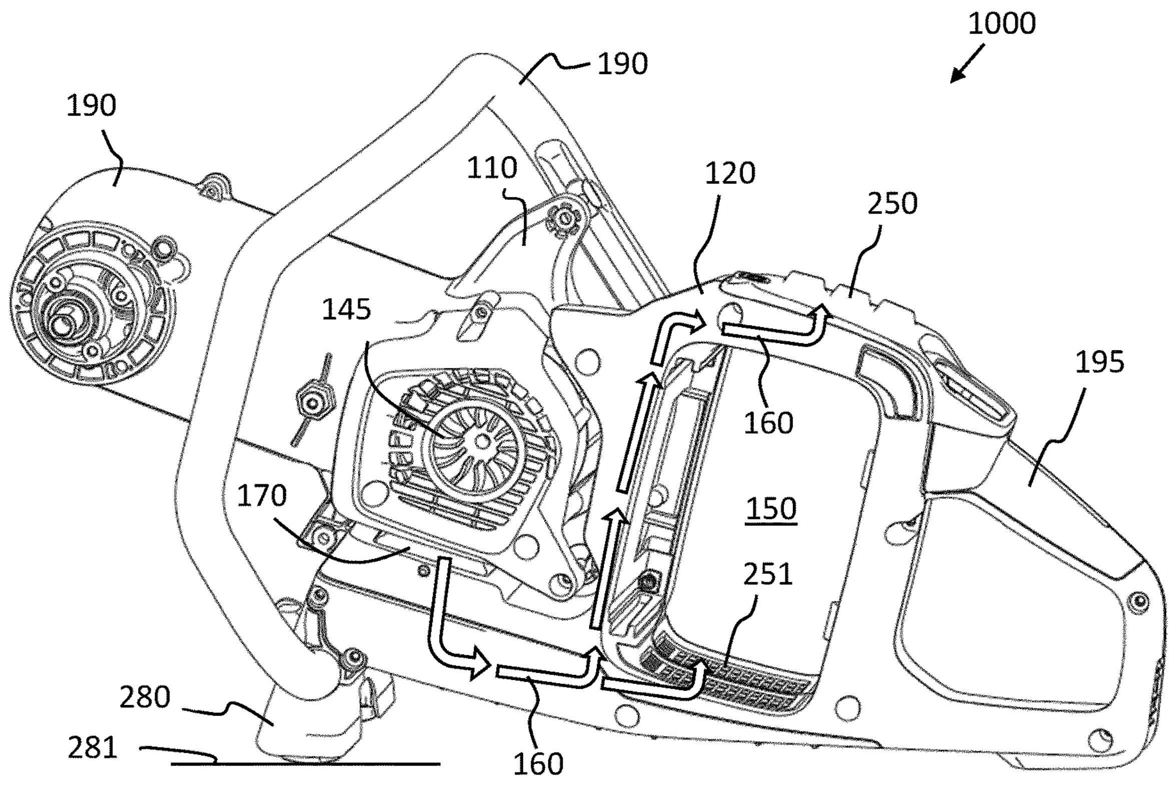
FIGS. 10A-C show views of an example work tool.

With reference to FIG. 10A, the portion of the air flow 160 guided downwards from the fan and then backwards in the tool also exits the work tool via a third air outlet 251 formed inside the battery compartment 151. This third outlet is mainly arranged to cool a battery received in the battery compartment 150.

Figure 3A:
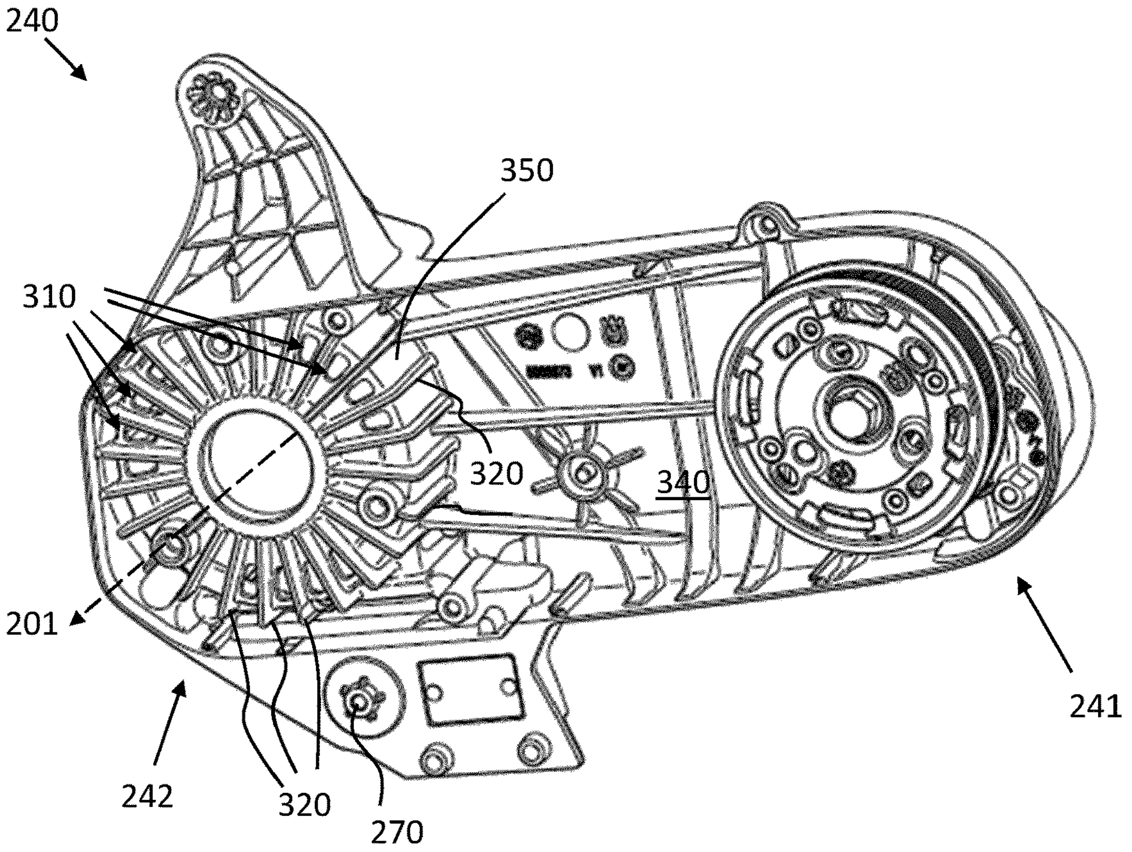
FIGS. 3A-B show views of a work tool support arm.
Figure 3B:
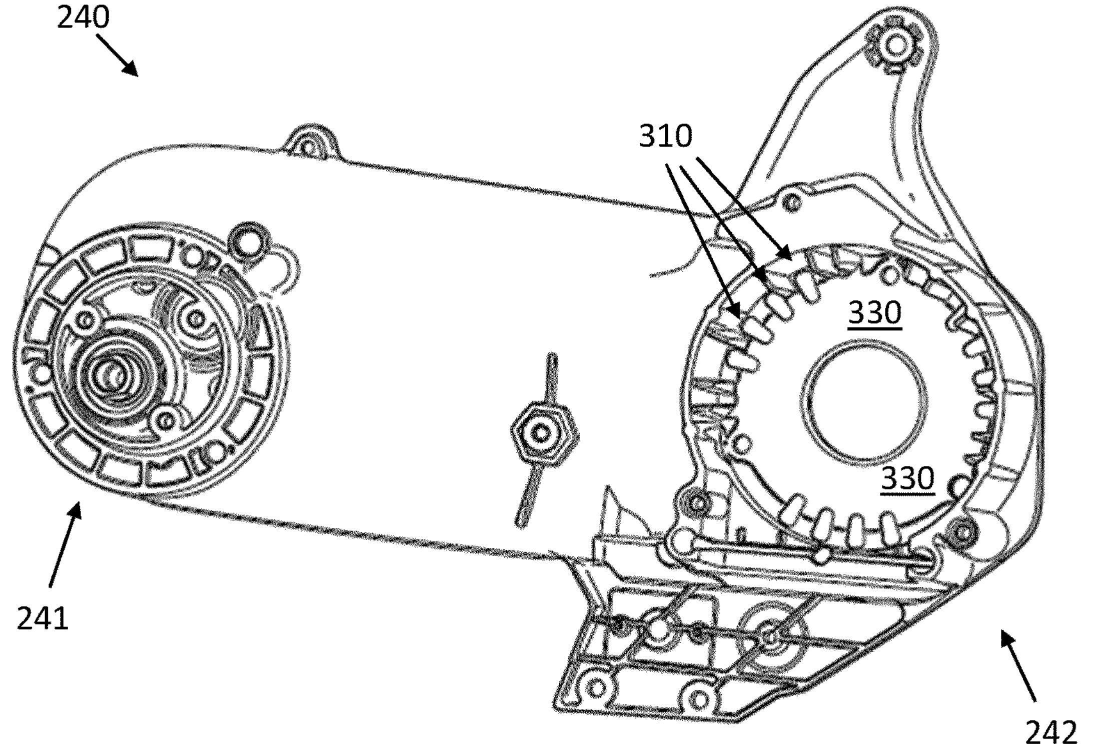

FIGS. 3A and 3B illustrates some aspects of the disclosed work tool, wherein the first part 110 comprises a thermally conductive support arm 240 arranged to support the circular cutting tool 130 on a first end of the support arm 241, and to support the electric motor 140 by a support surface 330 at a second end of the support arm 242 opposite to the first end 241. The motor 140 is then arranged to drive the cutting tool via some type of drive arrangement, such as a belt drive or a combination of belt drive and geared transmission. The belt is not shown in FIG. 3A, only the belt pulley. The support surface 330 represents a relatively large interfacing area between the motor 140 and the support arm 240, which allows for a significant amount of heat transfer from the motor and into the support arm material, at least if the electric motor comprises a corresponding surface for interfacing with the support surface. This heat is then dissipated from one or more cooling flanges 320 formed on the support arm 240. Thus, the support arm 240 comprises one or more cooling flanges 320 arranged to dissipate heat away from the electric motor 140 via the support surface 330.

The support arm 240 is an arm of the cut-off tool, it may equivalently be referred to as a cut-off arm 240.

This heat transfer arrangement improves the heat dissipation from the motor since the cooling air flow is more efficiently utilized to transport the heat away from the motor.

The more thermally conductive the support arm is, the more efficient is the heat dissipation. According to some aspects, at least some parts of the support arm is formed in a material having a thermal conductivity property above 100 Watts per meter and Kelvin (W/mK). For instance, at least some parts of the support arm may be formed in aluminum, which has a thermal conductivity of about 237 W/mK. Iron or steel is another option which would provide the desired thermal conductivity. The support arm may also be formed in different materials, i.e., one highly thermally conductive material such as copper, magnesium or aluminum can be used for the cooling flanges and another material, such as cast iron or steel, to provide general structural support.

Figure 14A:
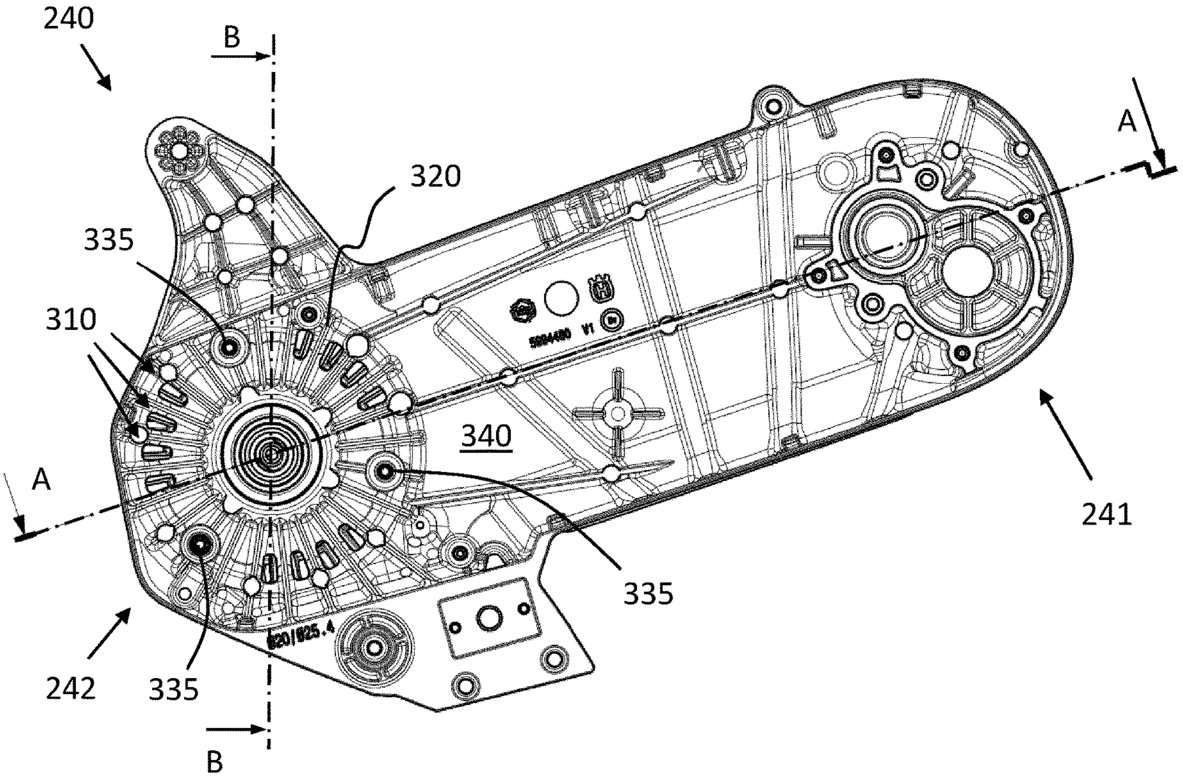
FIGS. 14A-C show details of a work tool support arm.
Figure 14B:
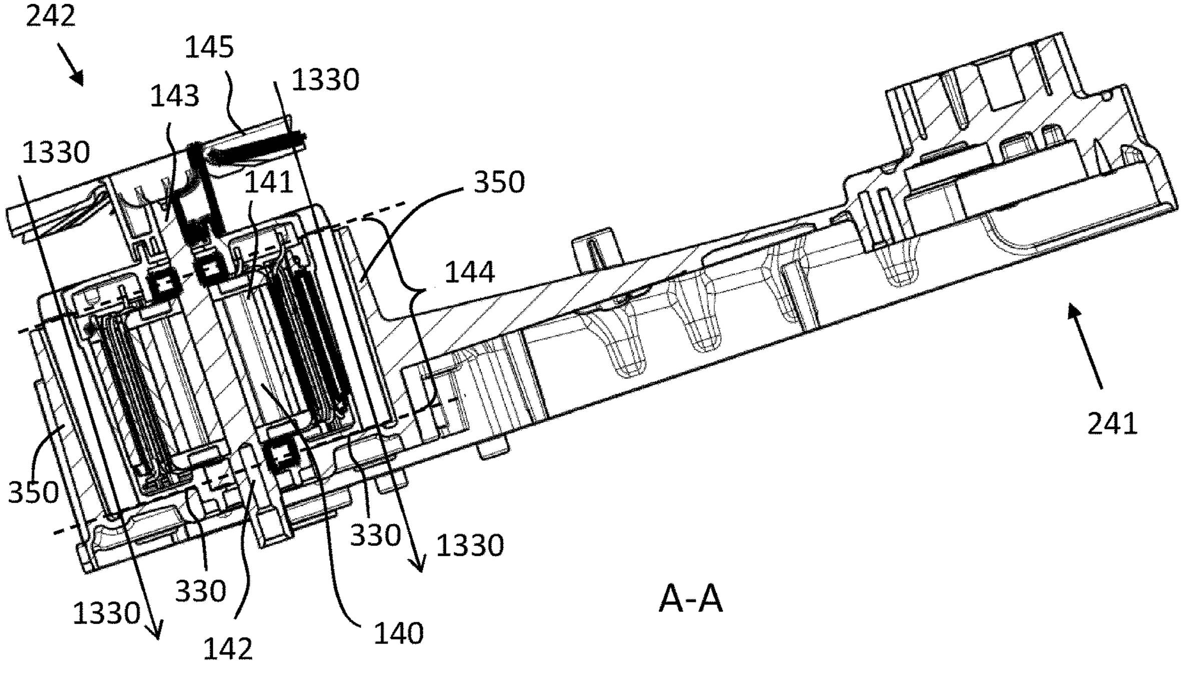
Figure 14C:
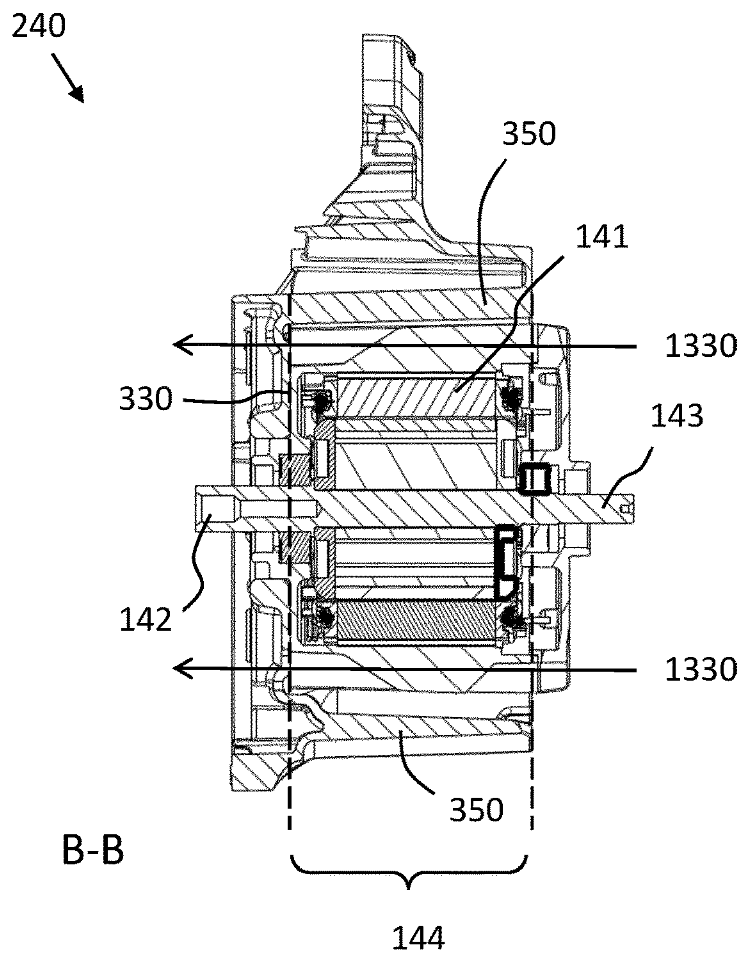

FIGS. 14A-14C and FIG. 15 show details of an example support arm 240 arranged to support the circular cutting tool 130 on a first end of the support arm 241, and to support the electric motor 140 by a support surface 330 at a second end of the support arm 242 opposite to the first end 241. FIG. 14A shows a view of the support arm 240 and the interior space 340 discussed above. FIG. 14B shows a first cross-sectional view along line A-A and FIG. 14C shows a second cross-sectional view along line B-B. The motor 140 comprises a motor axle extending through the motor housing 141 in a known manner.

Figure 15:
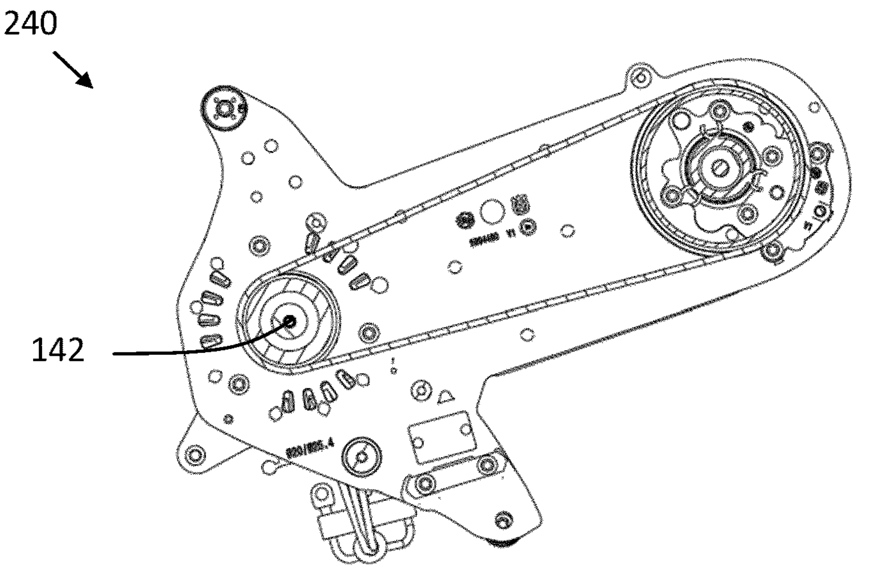
FIG. 15 illustrates a drive arrangement for driving a circular cutting tool.

A first end 142 of the axle is arranged to hold a pulley for driving the circular cutting tool 130. FIG. 15 shows a view of the support arm 240 with the drive pulleys and the drive belt in place to drive the circular cutting tool 130.

A second end 143 of the motor axle is arranged to drive the fan 145. The example fan 145 shown in FIG. 14B is a regular axial fan. Another more advanced example of the fan 145 will be discussed below in connection to FIGS. 11-13.

Optionally, the support arm 240 is arranged to enclose the electric motor at least partially 140, thereby protecting the motor and improving the cooling efficiency of the air flow 1330 past the motor. Towards this end, the support arm 240 comprises a cup-shaped recess, seen in detail in FIG. 10C, where the support surface 330 makes up the bottom portion of the recess and a cylinder shaped wall 350 extends out from a perimeter of the support surface 330 to enclose the motor housing 141 of the electric motor 140 when the motor is supported on the support surface 330. The motor 140 is arranged to be firmly bolted onto the support surface 330 through bolt holes 335, thereby ensuring good thermal conduction between the motor 140 and the support arm 240 as well as mechanical integrity. A slot is formed between the cylinder shaped wall 350 and the motor 140, i.e., the recess wall 350 is distanced radially from the motor housing. This slot is arranged to guide a flow of cooling air 1330 from the fan 145 past the motor 140. The flow 1330 extends transversally from the fan 145 through the support arm 240 to cool the electric motor 140. The flow of cooling air 1330 then passes through the openings 310 and into the interior space 340 and then out via the first air outlet 245 shown in FIG. 2B.

According to some aspects, at least 30% of a volume of the electric motor 140, i.e., the volume of the electric motor including its housing 141, is enclosed by the support arm 240. This means that the cylinder shaped wall 350 extends a distance 144 from the support surface 330 to enclose at least 30% of the volume of the motor housing 141. Thus, the motor is optionally significantly embedded into the support arm, or even entirely embedded as shown in FIGS. 14A-14C, thereby improving both structural integrity of the motor and support arm assembly, as well as improving heat transport away from the electric motor. The cooling of the electric motor 140 is also improved by the slot formed between the cylinder shaped wall and the electric motor housing, which cooperates with the thermally conductive support arm and the cooling flanges to cool the motor efficiently.

The support arm 240 and the electric motor 140 may also be at least partially integrally formed. This means that some parts of the electric motor 140 may be shared with the support arm 240. For instance, a part of the support arm 240 may constitute part of the electric motor housing, such as a motor gable facing the support arm. The common part shared between the support arm 240 and the electric motor 140 may, e.g., be machined or molded. Also, optionally, the electric motor axle may bear against a surface of the support arm, to improve mechanical integrity.

It is noted that the feature of an at least partially integrally formed support arm and electric motor can be advantageously combined with the other features disclosed herein but is not dependent on any of the other features disclosed herein. Thus, there is disclosed herein a support arm 240 and electric motor 140 assembly for a work tool 100, where the support arm and the electric motor are at least partially integrally formed.

With reference to FIG. 2B, the first part 110 optionally comprises a belt guard 115 configured to enclose the interior space 340. As discussed above, a portion of the flow of cooling air is arranged to be guided into the interior space 340, thereby increasing an air pressure in the belt guard 115 interior space 340 above an ambient air pressure level. The interior space 340 is delimited on one side by the support arm (discussed below in connection to FIGS. 3A and 3B), and on the other side by the belt guard 115, which assumes the function of a lid arranged to engage the support arm to protect the drive belt among other things. The belt guard 115 comprises an air outlet 245 through which the flow of cooling air exits the interior space. This air outlet 245 is configured with an area such that the air pressure in the belt guard 115 interior space 340 increases above the ambient air pressure level by a desired amount.

The increase in air pressure in the interior space 340 means that a flow of air will exit through all openings into the interior space 340, i.e., any cracks and the like, and not just the air outlet 245. This in turn means that water, dust, debris, and slurry will have to overcome this flow of air in order to enter into the interior. Thus, accumulation of unwanted material inside the work tool is reduced.

Water inside the interior space 340 may cause the belt drive to slip and is therefore undesirable. The increase in air pressure in the belt guard 115 interior space 340 means that less water is able to enter the interior space, which is an advantage. As a consequence, requirements on the belt can be reduced, such that, e.g., belts with a smaller number of ribs can be used.

Figure 4:
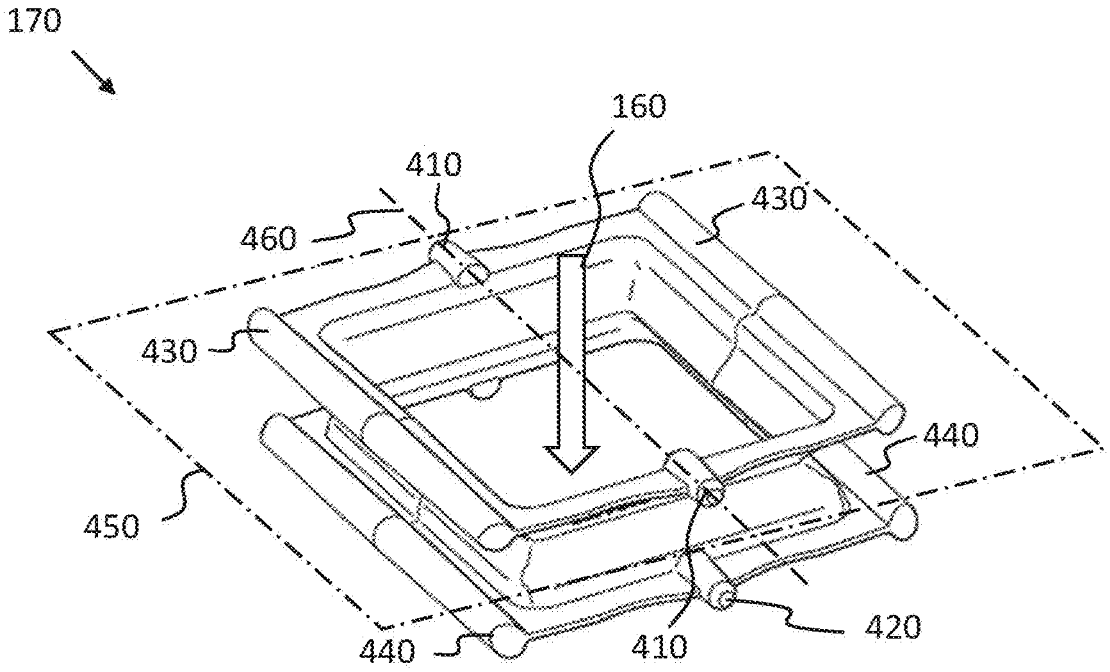
FIGS. 4-6 illustrate bellows for guiding an air flow.

As noted above, the portion of the flow of cooling air 160 guided from the first part 110 and into the second part 120 may pass via a bellows or other flexible air flow conduit 170 arranged in-between the first 110 and the second 120 parts. FIG. 4 shows an example of such bellows 10 in detail.

According to some aspects, the bellows 170 is associated with a Shore durometer value, or Shore hardness, between 10-70, and preferably between 50-60, measured with durometer type A according to DIN ISO 7619-1.

The bellows 170 optionally comprises a poka-yoke feature 410, 420. This poka-yoke feature comprises at least one protrusion 410, 420 configured to enter a corresponding recess formed in the first part 110 and/or in the second part 120, thereby preventing erroneous assembly of the bellows with the first 110 and second 120 parts.

Figure 5:
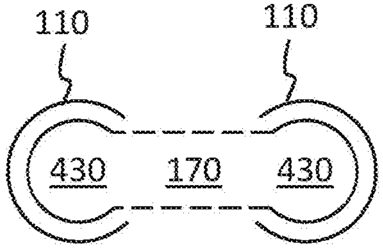
Figure 6:
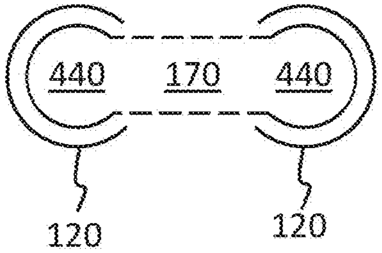

The bellows 170 also optionally comprises at least one edge portion 430, 440 of increased thickness. Each such edge portion is arranged to enter a corresponding groove formed in the first part 110 or in the second part 120, thereby fixing the bellows 170 in relation to the first or second part similar to a sail leech fitting into a mast. FIGS. 5 and 6 schematically illustrate a bellows fitted onto the first and second parts, respectively, by the edge portions.

The bellows illustrated in FIG. 4 is arranged with a shape that is symmetric about a symmetry plane 450 parallel to an extension direction of the edge portions 430, 440. Thus, advantageously, the bellows can be assembled with the first and second parts independently of which side of the bellows that is facing upwards. I.e., the bellows can be rotated 180 degrees about the symmetry axis 460 and assembled with the first and second parts.

Figure 7A:
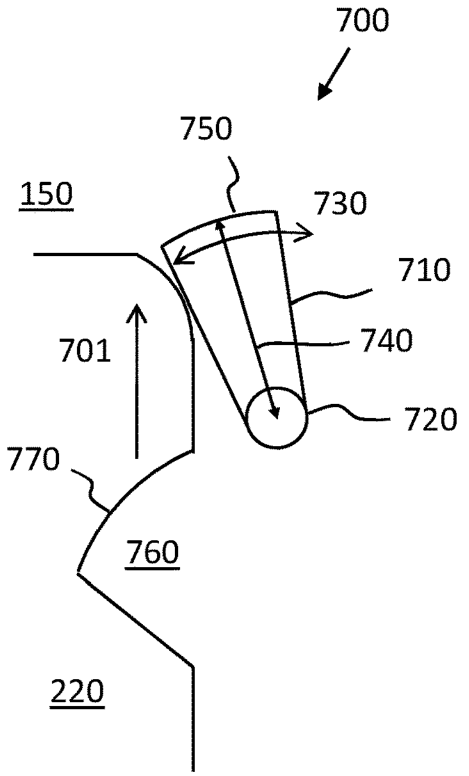
FIGS. 7A-C schematically illustrate a locking mechanism.
Figure 7B:
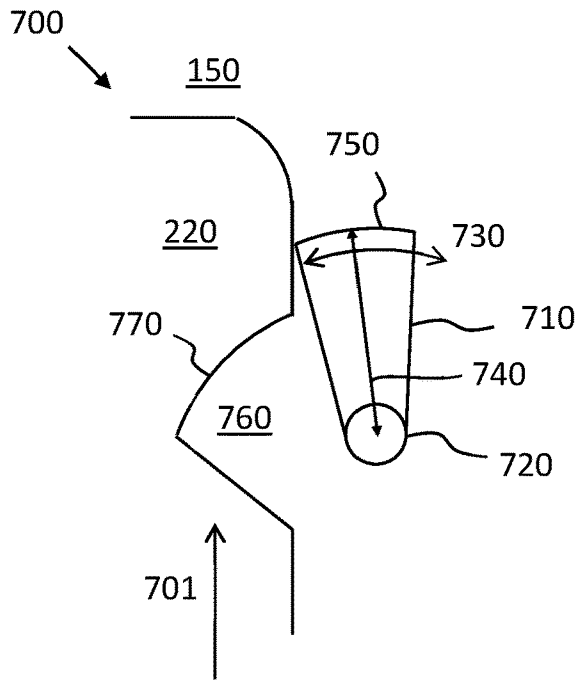
Figure 7C:
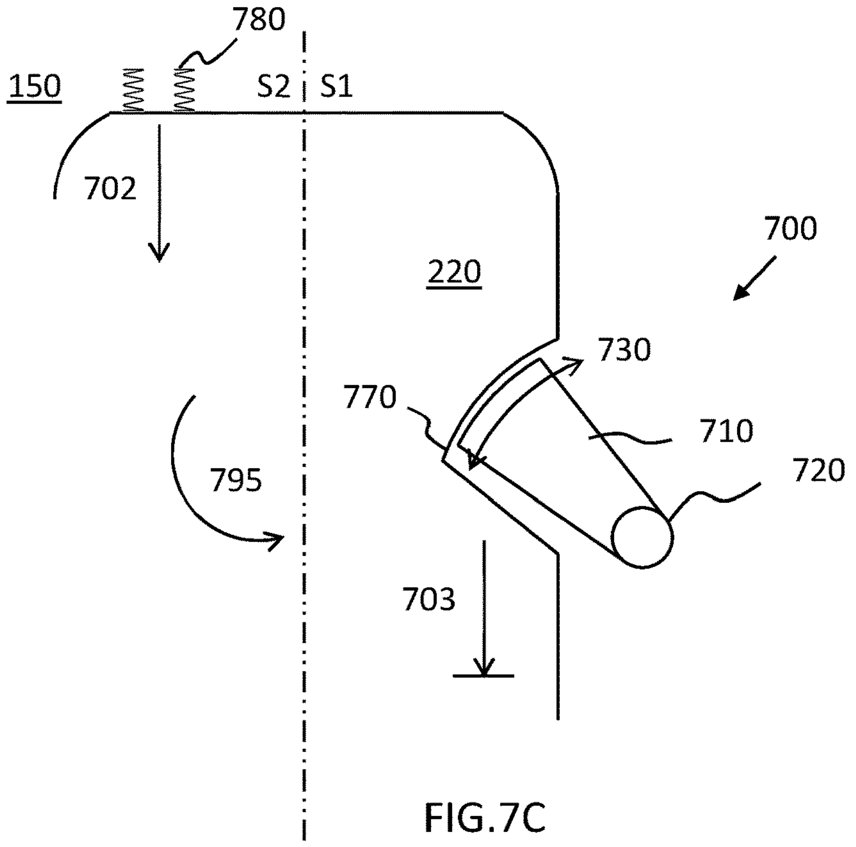

FIGS. 7A-C schematically illustrate aspects of the battery compartment 150, where the battery compartment comprises a battery lock mechanism 700. The battery lock mechanism comprises a locking member 710 rotatably supported on a shaft 720. The locking member comprises a leading edge portion 750 arranged to enter a recess 760 formed in the electrical energy source 220 to lock the electrical energy source in position, wherein the leading edge portion 750 has an arcuate form with a curvature corresponding to that of a circle segment with radius 740 corresponding to the distance from the leading edge portion 750 to the center of the shaft 720, and wherein the recess 760 formed in the energy source 220 comprises a surface 770 arranged to engage the leading edge portion 750, wherein the surface 770 has an arcuate form to match that of the leading edge portion 750.

This way, as the electrical energy source 220 is received in the battery compartment 150, the locking member is inactive, simply yielding to the electrical energy source as it enters the compartment. This phase of inserting the electrical energy source 220 into the compartment 150 by moving it in an insertion direction 701 is schematically illustrated in FIGS. 7A and 7B. The locking member 710 then swings into the recess 760 where it prevents the battery to be retracted from the battery compartment. The locking position is illustrated in FIG. 7C. Notably, the arcuate form of the leading edge portion 750 allows the locking mechanism to be rotated out of the locking position with less resistance even if there is some friction between the leading edge portion 750 and the surface 770 arranged to engage the leading edge portion 750.

The locking member may be arranged spring biased towards the locking position, and operable by means of a lever or push-button mechanism, discussed below in connection to FIGS. 8 and 9.

According to some aspects, the battery compartment 150 comprises at least one resilient member 780 arranged to urge the electrical energy source into the locking position, i.e., urge the electrical energy source in a direction opposite that of the insertion direction 701. The resilient member 780, when compressed by the electrical energy source, pushes onto the electrical energy source to repel it from the battery compartment 150. This pushing force increases the contact pressure between the leading edge portion 750 and the surface 770 arranged to engage the leading edge portion 750, thereby improving the holding effect on the electrical energy source.

According to an example, a user inserts a battery into the battery compartment in an insertion direction. When the battery is inserted all the way, it contacts the resilient member 780 and the locking member 710 enters the recess 760 formed in the electrical energy source 220 to lock the electrical energy source in position. The resilient member, when compressed by the battery, pushes back in a direction opposite to the insertion direction. This pushing force from the resilient member increases a contact force between the leading edge portion 750 of the locking member and the surface 770 arranged to engage the leading edge portion 750, to hold the battery more securely in position.

The resilient member 780 optionally comprises any of a resilient material member, a compression spring, and/or a leaf spring.

The resilient member 708 will also eject the electrical energy source 220 a short distance from the battery compartment 150 when the electrical energy source is released by the locking mechanism 700. Thus, when the bush-button mechanism 810 is operated to release a battery, the battery is ejected from the battery compartment 150, making it easier to grasp the battery and pull it out from the battery compartment.

FIG. 7C schematically shows an example of such resilient members 780. The resilient members urge the electrical energy source in direction 702, but the electrical energy source is prevented from moving in this direction by the locking member 710 engaging the recess 760. The arrangement of resilient member 780 and locking member 710 on opposite sides S1, S2, of the electrical energy source 220 generates a twisting motion 795 or rotation moment which further increases the holding effect by increasing friction between battery and battery compartment wall, in a manner similar to a stuck cupboard or desk drawer. This further increase in holding effect reduces vibration by the battery since it is now held even more snugly in the battery compartment.

Figure 8:
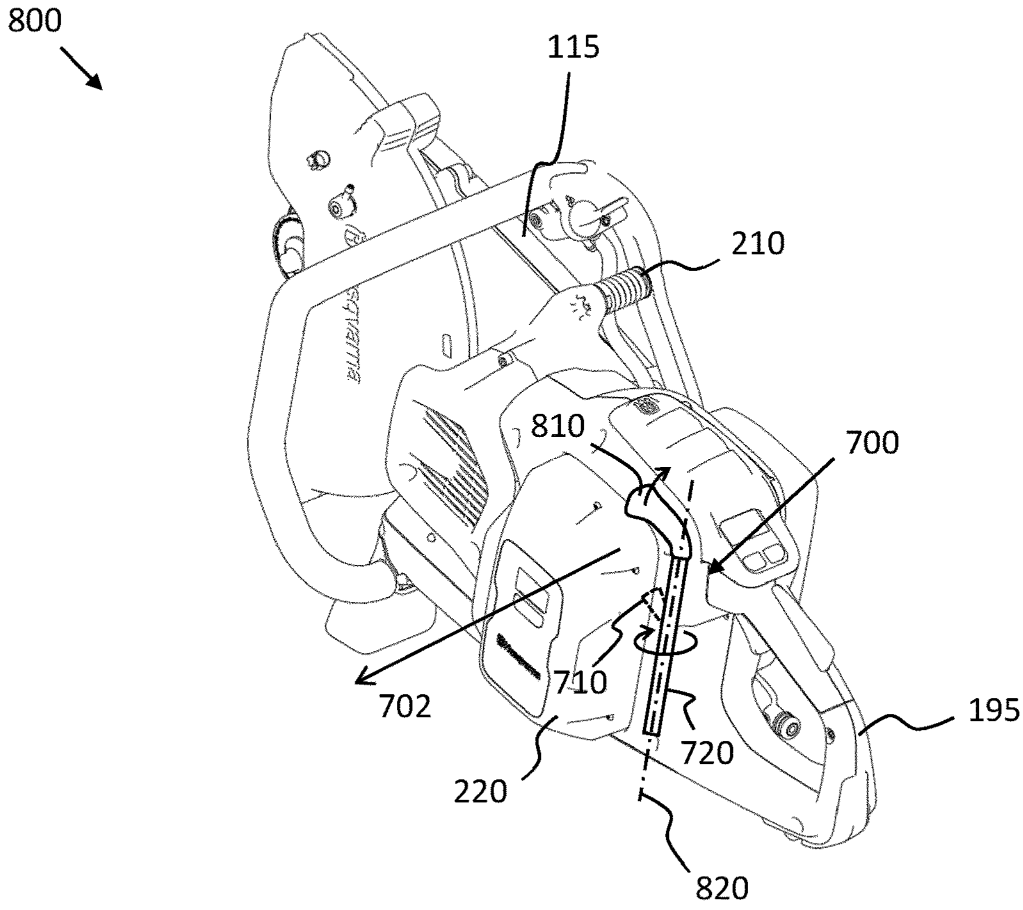
FIG. 8 shows an example work tool with a battery locking mechanism.

FIG. 8 shows an example work tool 800 which comprises the battery lock mechanism 700. The locking member 710 is rotatably supported on a shaft 720, where it is allowed to rotate about an axis 820 of rotation. A push-button mechanism 810 can be used by the operator to rotate the locking member 710 such that it exits the recess, thereby allowing removal of the battery in direction 702.

According to some aspects the locking member 710 is spring biased towards the locking position. Thus, as an electrical energy source 220 is inserted into the recess 150, the locking member 710 snaps into the locking position. The spring bias force can be overcome by the push-button mechanism 810 when the electrical energy source is to be removed from the battery compartment.

Figure 9:
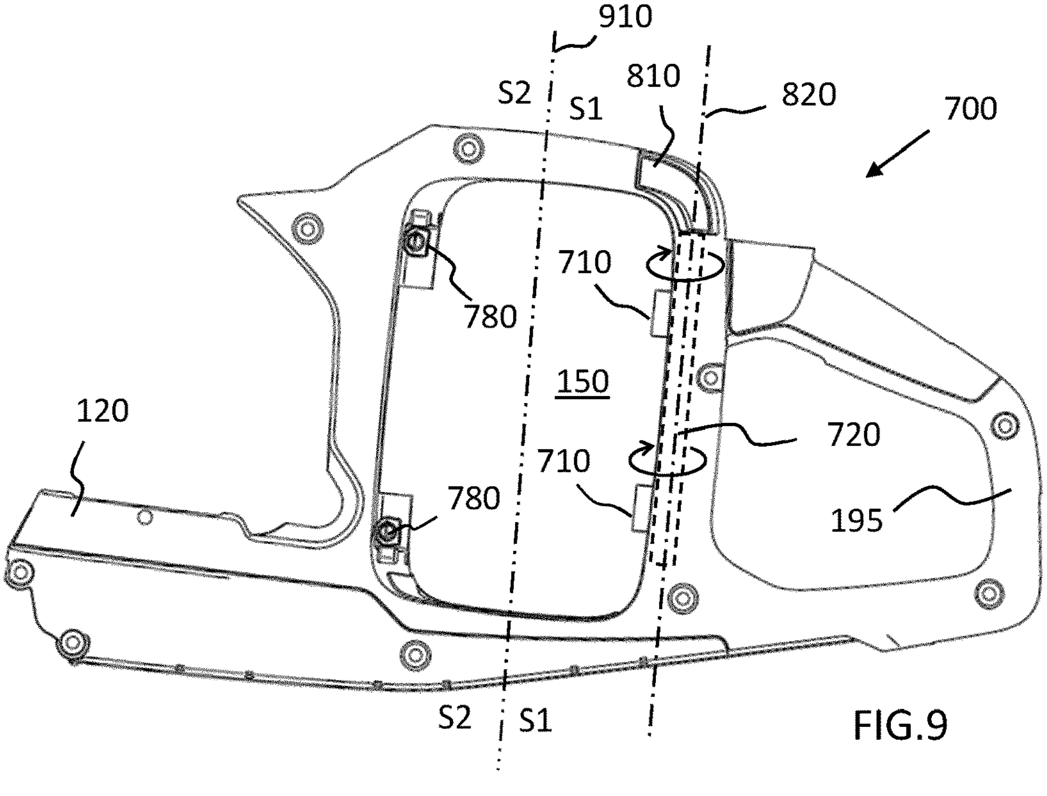
FIG. 9 schematically illustrates details of a battery lock mechanism.

FIG. 9 illustrates details of a battery lock mechanism 700 for a battery compartment 150. This battery lock mechanism can be used with many different types of tools, i.e., abrasive tools, grinders, chainsaws, drills, cut-of tools, and the like. Thus, the battery lock mechanisms disclosed herein are not limited to use with the cut-off tools discussed above in connection to FIGS. 1-8.

The battery lock mechanism 700 shown in FIG. 9 comprises a locking member 710 rotatably supported on a shaft 720 and optionally spring biased into a locking position as discussed above. The locking member comprises a leading edge portion 750 arranged to enter a recess 760 formed in the electrical energy source 220 to lock the electrical energy source in position, as discussed above in connection to FIGS. 7A-C. The leading edge portion 750 may have an arcuate form with a curvature corresponding to that of a circle segment with radius 740 corresponding to the distance from the leading edge portion 750 to the center of the shaft 720. The recess 760 formed in the energy source 220 comprises a surface 770 arranged to engage the leading edge portion 750. This surface 770 has an arcuate form to match that of the leading edge portion 750. Notably, the battery lock mechanism 700 illustrated in FIG. 9 comprises two locking members 710 separated by a distance. This double arrangement of locking members improves robustness of the lock mechanism 700.

Thus, as explained in connection to FIGS. 7A-C, an electrical energy source such as a battery can be inserted into the battery compartment in an insertion direction 701, i.e., into the compartment 150 shown in FIG. 9. At some point the locking member is able to enter into the locking position, i.e., it enters the recess 760. In this position the battery is prevented from moving in a direction 702 opposite to the insertion direction 701. However, it may rattle some and may not be firmly secured. To improve the battery lock mechanism and to better hold the electrical energy source in position, one or more resilient members 780, such as compression springs or rubber bushings, are arranged in the battery compartment 150 and/or on the electrical energy source to push on the electrical energy source as it is inserted all the way into the compartment. The pushing force increases a contact force between the leading edge portion 750 and the surface 770 configured to engage the leading edge portion. This increased contact force increases friction to better hold the electrical energy source in position.

According to some aspects, the at least one resilient member 780 and the battery lock mechanism 700 are arranged at opposite sides S1, S2 of the battery compartment 150, i.e., there is a plane 910 that divides the battery compartment in two parts, where the resilient member 780 is comprised in one part and the battery lock mechanism is comprised in the other part. This means that the resilient member or members push onto the electrical battery source from a direction to cause a twisting motion 795 or torque. This twisting motion can be compared to a drawer which gets stuck in a cupboard or desk. The electrical energy source is then prevented from rattling and is more firmly secured in the battery compartment 150.

Figure 10B:
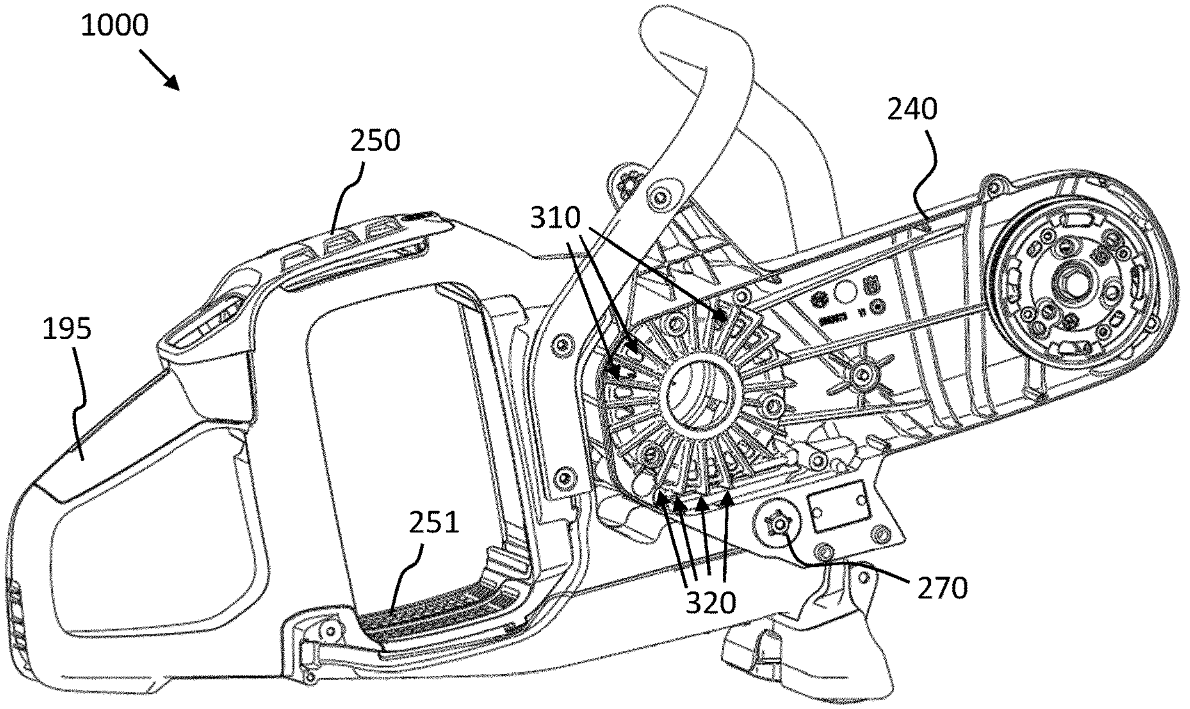
Figure 11:
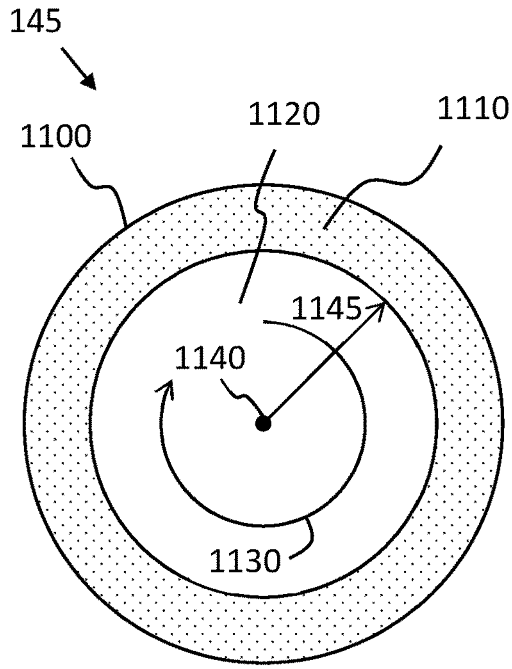
FIG. 11 schematically illustrates a fan.
Figure 12:
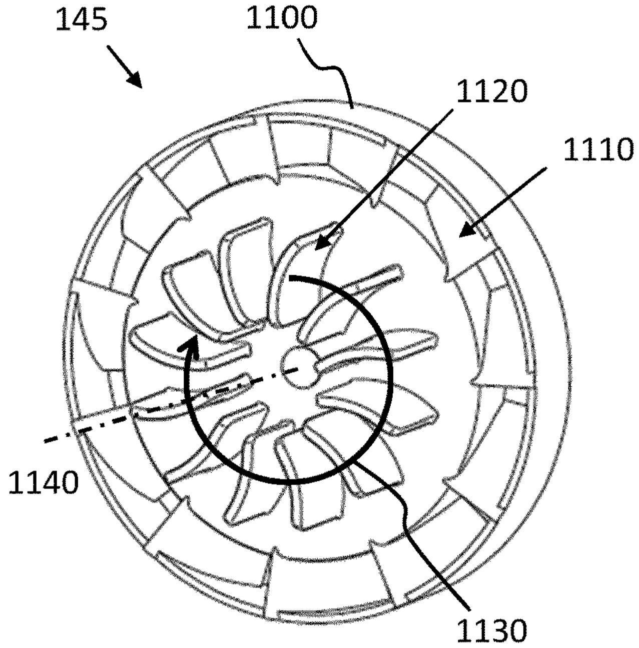
FIG. 12 shows an example fan for a work tool.

FIGS. 10A and 10B show an example work tool 1000 comprising a special type of fan 145. This fan comprises a member, preferably but not necessarily discoid shaped, arranged on the axle of the electric motor 140 which also constitutes an axis of rotation of the fan. The member extends in a plane perpendicular to the axis of rotation and comprises two different types of fan portions. A first portion acts as an axial fan and pushes cooling air transversally 201 across the work tool 1000 to cool the electric motor 140. A second section of the fan acts as a radial fan, also known as a centrifugal fan, to push cooling air downwards and into the second part of the work tool in cooperation with a fan scroll matched to the radial fan portion. The fan 145 is schematically illustrated in FIG. 11 and an example of the fan is shown in FIG. 12 where the direction of rotation 1130 and the axis of rotation 1140 have been indicated. FIG. 11 also indicates the direction 1145 referred to as 'radially outwards' from the axis of rotation 1140.

FIG. 10A shows an example tool where According to some aspects, the portion of the flow of cooling air 160 from the first part 110 and into the second part 120 is arranged to enter the electrical energy source 220 via a third outlet 251 arranged inside the battery compartment 150. This connection to the electrical energy source improves cooling efficiency by better cooling, e.g., the cells in a battery.

The fan 145 comprises an axial fan portion 1110 arranged peripherally on the fan 145, i.e., circumferentially along the fan disc border as shown in FIG. 11 and in FIG. 12, and a radial fan portion 1120 arranged centrally on the fan 145, i.e., radially inwards from the axial fan portion as shown in FIGS. 11 and 12. Thus, the axial fan portion is arranged radially outwards 1145 in the extension plane from the axis of rotation 1140. The axial fan portion 1110 is arranged to generate the flow of cooling air 1330 for cooling the electric motor 140, and the radial fan portion 1120 is arranged to generate the portion of the flow of cooling air 160 from the first part 110 and into the second part 120 for cooling the electrical storage device.

Axial flow fans, or axial fans, have blades that force air to move parallel to the shaft about which the blades rotate, i.e., the axis of rotation. This type of fan is used in a wide variety of applications, ranging from small cooling fans for electronics to the giant fans used in wind tunnels. The axial fan is particularly suitable for generating large air flows in straight tube-line conduits, which is the case here when cooling the electric motor 140.

Radial fans, or centrifugal fans, uses the centrifugal power supplied from the rotation of impellers to increase the kinetic energy of air/gases. When the impellers rotate, the gas particles near the impellers are thrown off from the impellers, then move into the fan housing wall. The gas is then guided to the exit by a fan scroll. A radial fan, compared to the axial fan, is better at pushing cooling air at a pressure passed air conduits with bends and narrow passages, which is the case for the air conduit passing into the second part and towards the battery compartment 150.

According to some aspects, the axial fan and the radial fan are formed as separate parts mounted on the same motor axle.

The radius of the radial fan may correspond to the radius of the electrical motor gable.

The relationship between the radius of the radial fan and the radius of the fan may be on the order of 50-70 percent.

Thus, advantageously, the fan illustrated in FIGS. 10-13 provide both efficient motor cooling as well as efficient cooling of tool members in the second part, e.g., the control unit and the electrical energy source. This is achieved by providing two different types of fans on a single fan member.

Figure 10C:
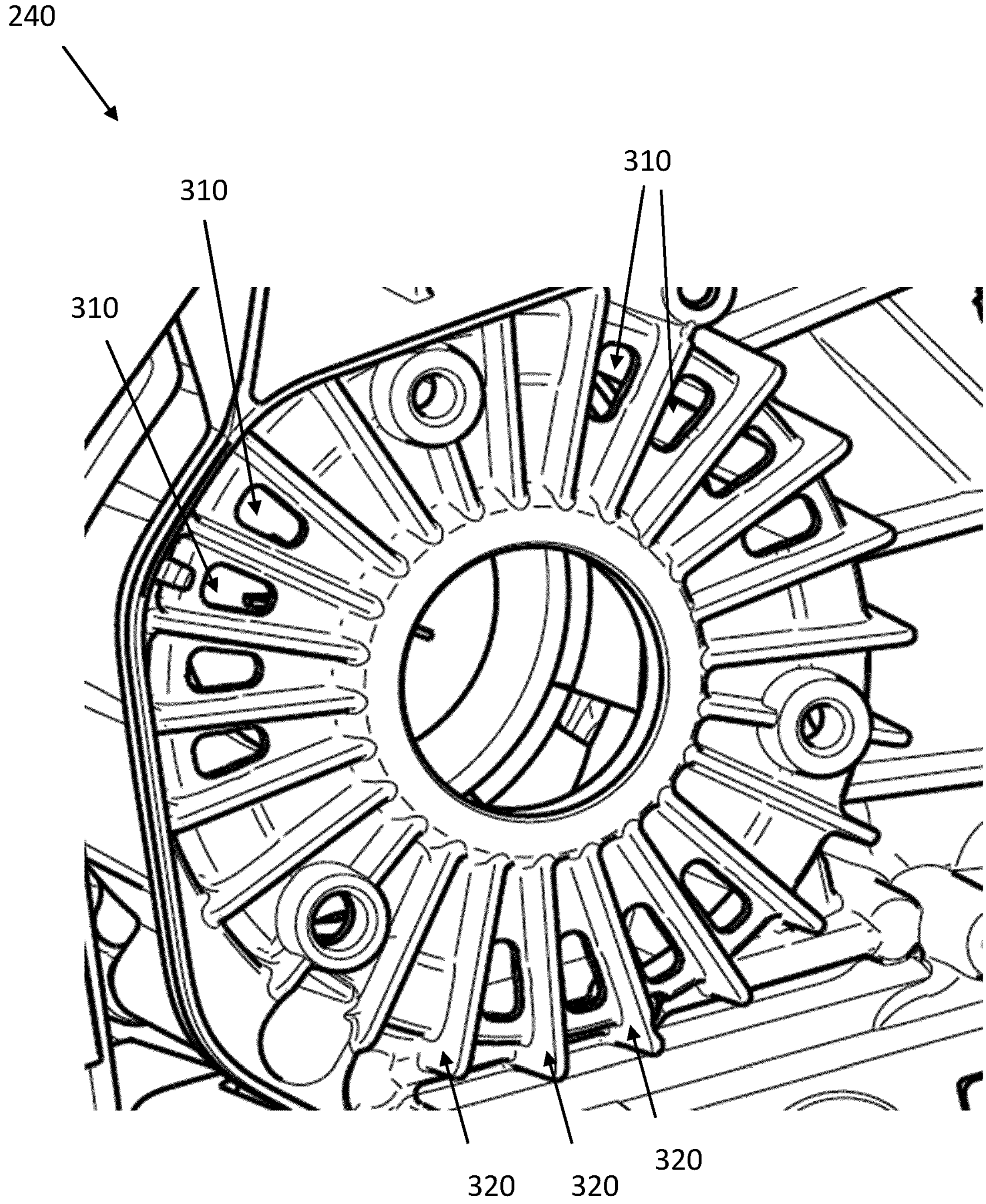

FIG. 10C shows a more detailed view of the part of the support arm which comprises the one or more cooling flanges 320 arranged to dissipate heat away from the electric motor 140 via the support surface 330. The openings 310 for letting air enter the interior space 340 discussed above can also be seen. The axial fan portion 1110 pushes air past the motor and through these holes, thereby cooling the electric motor 140.

Figure 13:
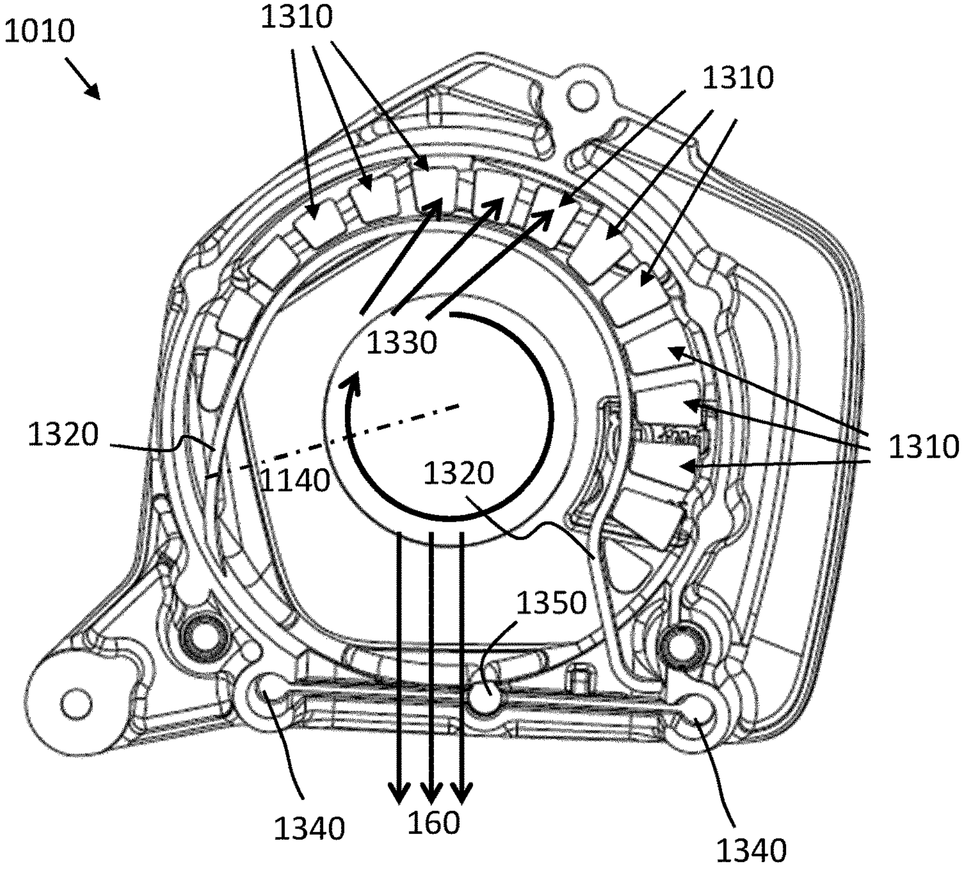
FIG. 13 shows an example fan housing.

The fan 145 may optionally be assembled in a fan housing 1010 exemplified in FIG. 13. The fan housing comprises at least one opening 1310 arranged peripherally and radially outwards from the axis of rotation 1140 to receive the flow of cooling air 1330 from the axial fan portion 1110 for cooling the electric motor 140. The fan housing also comprises a fan scroll 1320 arranged centrally in the housing to interface with the radial fan portion 1120 for guiding the portion of the flow of cooling air 160 from the first part 110 and into the second part 120 for cooling the electrical storage device.

FIG. 13 also shows the grooves 1340 and the recesses 1350 for receiving the bellows 170 with the edge portions 430 and the poka-yoke feature 410 illustrated in FIG. 4.

The fan discussed in connection to FIGS. 10A, B, 11, 12, and 13 is not only applicable to the types of work tools disclosed herein. On the contrary, this fan can be used with advantage in any type of work tool where a first flow of cooling air and a second flow is desired. Thus, there is disclosed herein a fan 145 for a hand-held work tool 100, 200, 800, 1000. The fan 145 extends in a plane perpendicular to an axis of rotation of the fan 1140. The fan comprises an axial fan portion 1110 arranged radially outwards 145 from a radial fan portion 1120 arranged centrally on the fan 145 with respect to the axis of rotation 1140, wherein the axial fan portion 1110 is arranged to generate a first flow of cooling air for cooling a first hand-held work tool member, and wherein the radial fan portion 1120 is arranged to generate a second flow of cooling air 160 for cooling a second hand-held work tool member.

Optionally, the axial fan portion 1110 has an annular shape centered on the axis of rotation 1140, and wherein the radial fan portion 1120 has a discoid shape centered on the axis of rotation 1140.

There is also disclosed herein a hand-held work tool 1000 comprising the fan discussed in connection to FIGS. 10-13, and a fan housing 1010. The fan 145 is assembled in the fan housing 1010, which fan housing comprises at least one opening 1310 arranged peripherally in the fan housing and radially outwards from the axis of rotation 1140 of the fan 145 to receive the first flow of cooling air from the axial fan portion 1110 for cooling the first hand-held work tool member, the fan housing also comprises a fan scroll 1320 arranged centrally in the fan housing to interface with the radial fan portion for guiding the second flow of cooling air 160 for cooling a second hand-held work tool member.

Figure 16A:
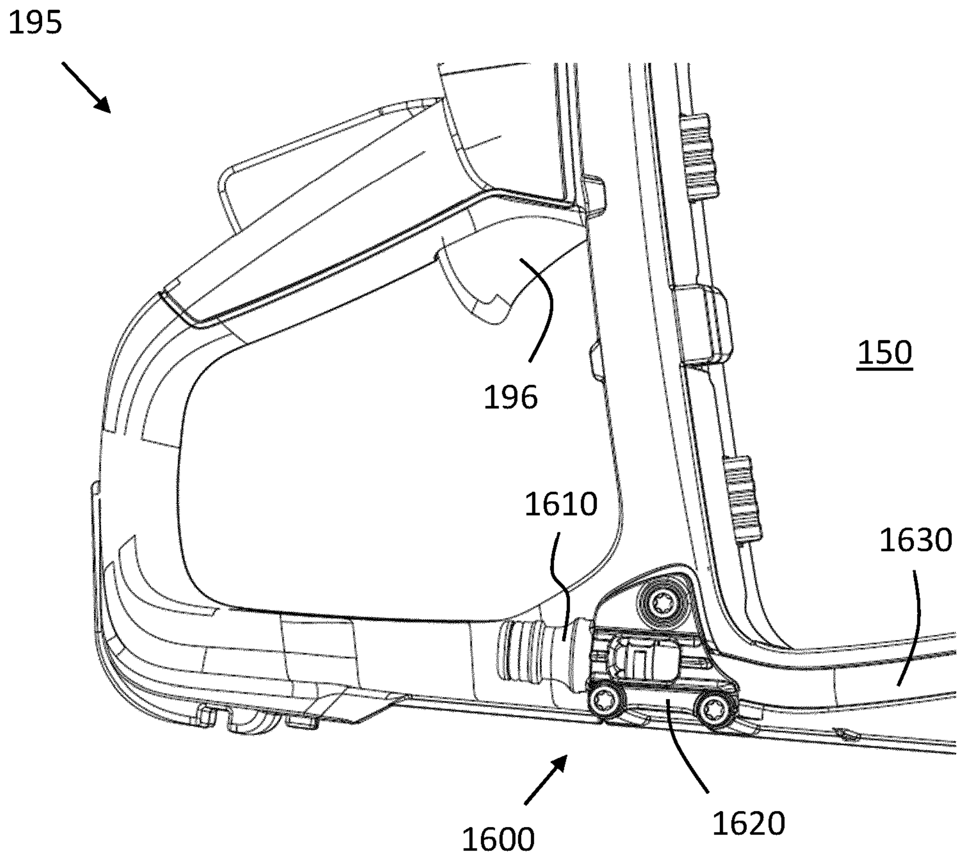
FIG. 16A shows a rear handle section with a water hose connection.

FIG. 16A illustrates details of an optional connector arrangement 1600 for a water hose which is preferably mounted in vicinity of the rear handle 195 where it is easily accessible by an operator to attach and to detach a water hose. The connector arrangement 1600 comprises a water hose connector part 1610, here shown as a nipple, i.e. a connector male part, for a water hose quick connector system facing rearwards away from the circular cutting tool 130. The connector nipple 1610 is mounted fixedly onto the machine housing by a bracket 1620 such that the water hose connector part 1610 is fixedly held in relation to the work tool. Alternatively, a female water hose connector part can be fixedly mounted onto the work tool by a similar bracket to obtain the same technical effect and advantages. A water hose 1630 extends away from the connector part 1610 towards the cutting tool 130. The water hose 1630 is arranged at least partly embedded into the tool housing, in order to protect the water hose from damage during use of the tool 100.

Known water hose connector arrangements often comprise a segment of hose in-between a bracket on the work tool and the connector part (male or female connector part), which means that it is difficult to connect and to disconnect the water hose with a single hand. The connector arrangement 1600, however, allows for attachment and detachment of a water hose for supplying water to the cutting tool 130 during operation by one hand, since the connector nipple 1610 is mounted fixedly onto the machine housing by the bracket 1620. Thus, the connector part is firmly supported by the machine housing where it is easily accessible and does not move around. An operator may, for instance, hold the tool by the front handle 190 with one hand and connect the water hose with the other hand. The connector part 1610 may be adapted for interfacing with any quick connector system on the market, such as the Gardena® water hose system.

The water hose connector arrangement 1600 comprising the connector part 1610 and the bracket 1620 can be implemented on any power tool requiring a supply of water, it is not limited to the particular tools discussed herein.

Figure 16B:
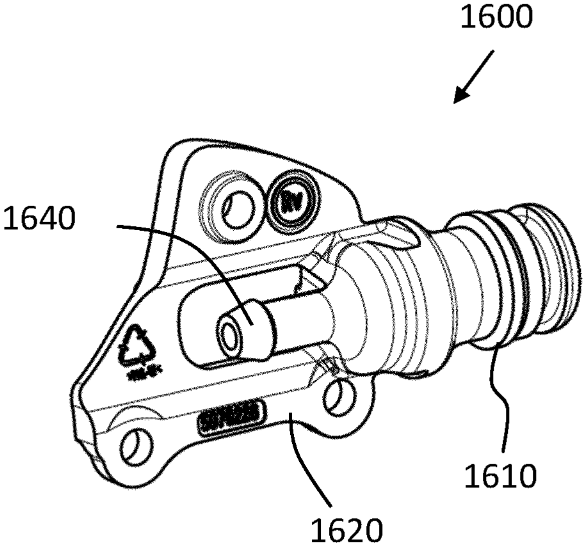
FIGS. 16B-C show details of a water hose connector arrangement.
Figure 16C:
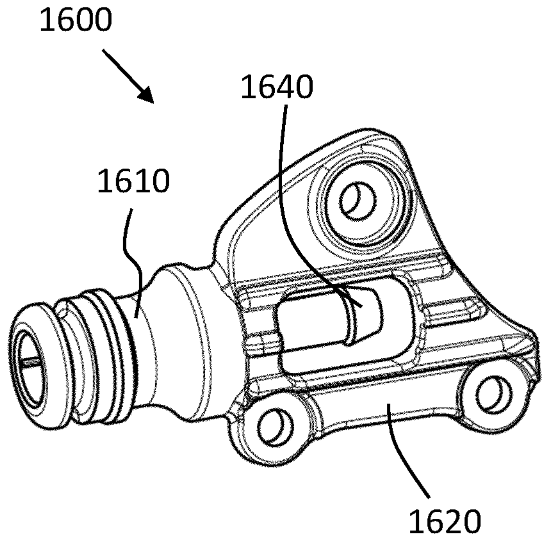

FIGS. 16B and 16C show views of the connector arrangement 1600 in more detail. FIG. 16B is a view corresponding to that in FIG. 16A, while FIG. 16C shows the connector arrangement 1600 from an opposite point of view. The connector part 1610 and the bracket 1620 are preferably integrally formed, i.e., machined or molded from one piece of material, such as a piece of plastic or metal. An internal nipple 1640 for attaching the water hose 1630 may be arranged opposite to the connector part 1610 for convenient assembly of the connector arrangement on the hand-held work tool.

Figure 17A:
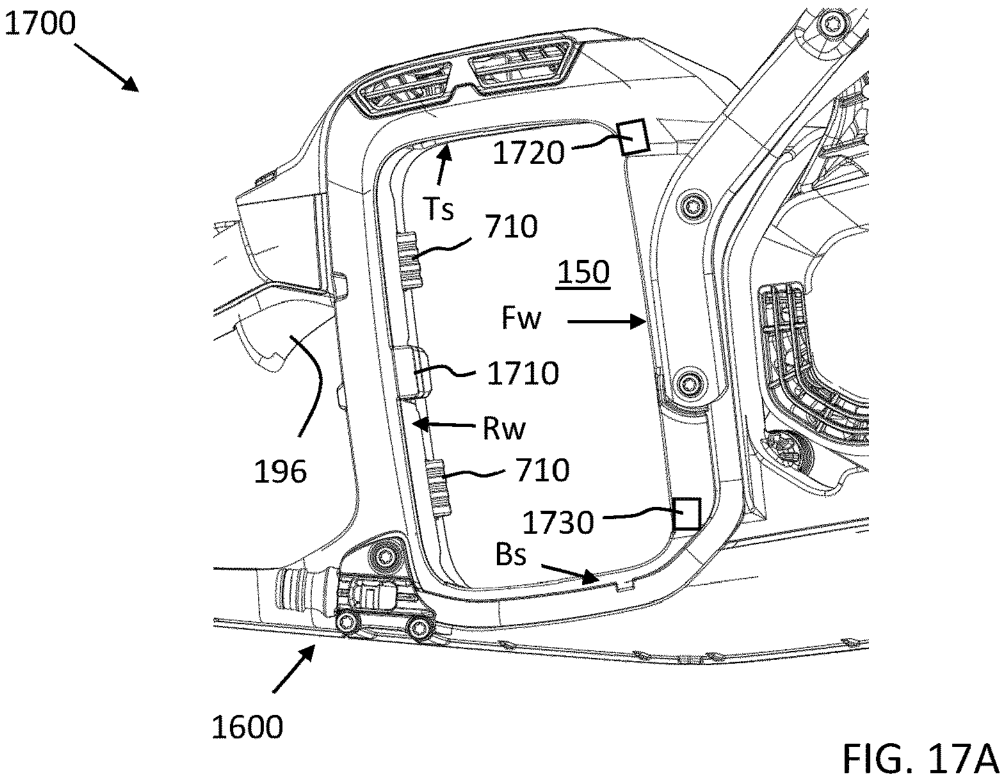
FIGS. 17A-B illustrate details of a battery compartment.
Figure 17B:
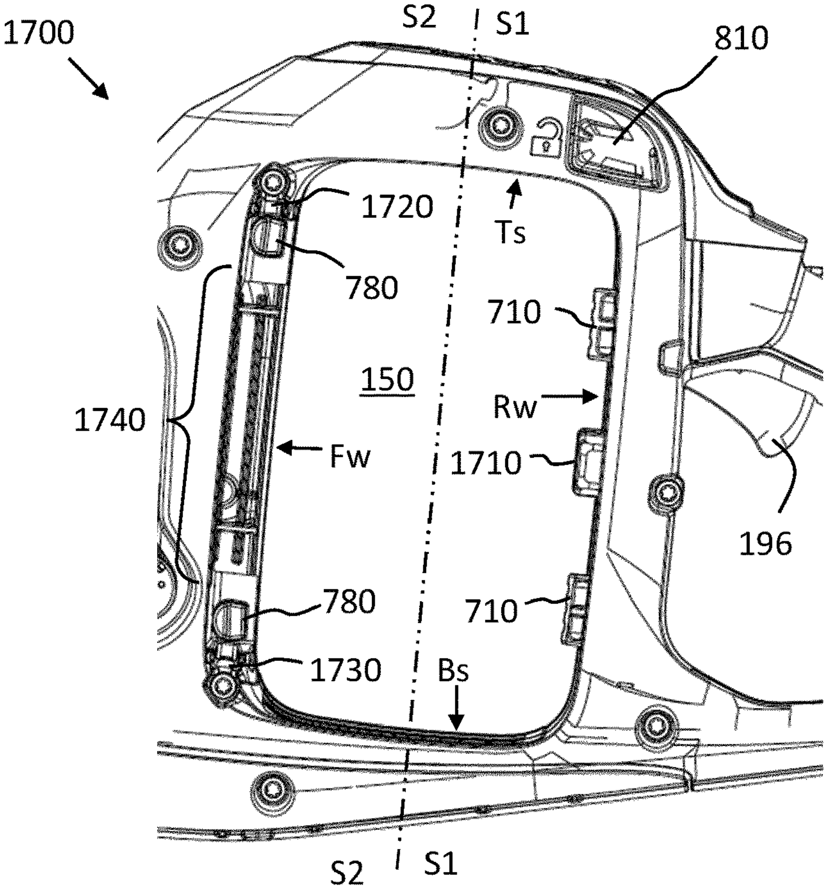

FIGS. 17A and 17B illustrate details of an example battery compartment 150. An electrical energy source such as a battery can be inserted into the battery compartment in an insertion direction 701, i.e., into the compartment 150 as also shown in FIG. 9. FIG. 17A is a view opposite to the insertion direction 701, while FIG. 17B is a view looking into the compartment 150 in the insertion direction 701. The locking members 710, discussed above in connection to, e.g., FIG. 9 can be seen in FIGS. 17A and 17B. The battery, which will be discussed in more detail below in connection to FIGS. 18A-C optionally comprises a rearward face formed as a handle to simplify both insertion and removal of the battery in the battery compartment 150.

Batteries for powering heavy duty cut-off tools such as the work tools discussed herein are normally quite heavy. Thus, the batteries must be held in the battery compartment 150 in a robust and reliable manner. Towards this end, the battery compartment 150 comprises a battery holding mechanism specifically adapted to support a heavy battery, i.e., weighting on the order of 5 kg, such as between 3-7 kg.

The battery compartment 150 extends transversally through the housing of the tool 100, 200 as discussed above, where it defines a volume for receiving a battery. The volume is delimited by a rear wall Rw and a front wall Fw, where the rear wall Rw is located towards the rear handle 195 on the tool 100 and the front wall Fw is located towards the front of the tool 100, i.e., towards the cutting tool 130. A bottom surface Bs and a top surface Fs also delimits the volume. The example volume in FIGS. 17A and 17B is of a rectangular shape with rounded corners.

The battery holding mechanism comprises a supporting heel 1710 arranged on a middle section of a side wall of the battery compartment, more specifically on the rear wall Rw closest to the rear handle 195. The heel is 1710 elongated with an elongation direction extending transversally through the battery compartment aligned with an insertion direction of the battery in the battery compartment 150. When the machine is resting on the ground support member 280, the supporting heel 1710 is parallel to ground. Also, when the tool 100 is held in a normal operating position, the supporting heel is parallel to ground, and therefore supports the battery against gravity. It is appreciated that the supporting heel 1710 can also be arranged on the front wall, i.e., on any of the front wall and/or the rear wall of the battery compartment. The battery, which is exemplified in FIGS. 18A-C and will be discussed below, comprises a corresponding groove matched to the supporting heel.

According to some aspects the supporting heel 1710 is metal shod for increased mechanical integrity, i.e., the supporting heel 1710 is optionally constructed with an outer layer metal layer for increased mechanical robustness.

According to some other aspects, the battery compartment also comprises an upper dove-tail groove 1720 and a lower dove-tail groove 1730 for supporting the battery in the battery compartment 150. The dove-tail grooves are arranged to mate with corresponding ridge structures on the battery, such that the battery can be inserted into the battery compartment 150 in mating position with the dove-tail grooves in the insertion direction 701. Thus, the supporting heel 1710 and the dove-tail grooves 1720, 1730 collaborate to support the battery in the battery compartment in a safe and roust manner. The dove-tail grooves 1720, 1730 have the function to guide the battery as it is inserted into the battery compartment 150 and prevents snagging as the battery is removed from the battery compartment 150.

According to some aspects, the dove-tail grooves 1720, 1730 are metal shod for increased mechanical strength, i.e., the grooves are reinforced with a lining layer of metal for increased mechanical robustness.

FIG. 17B also shows two resilient members 780 as discussed above in connection to FIG. 7C, arranged to urge the battery into the locking position, i.e., urge the electrical energy source in a direction opposite that of the insertion direction 701.

Contact strips 1740 extending in the insertion direction 701 are arranged in the battery compartment 150 to mate with corresponding electrical connectors configured in slots on the battery.

Figure 18A:
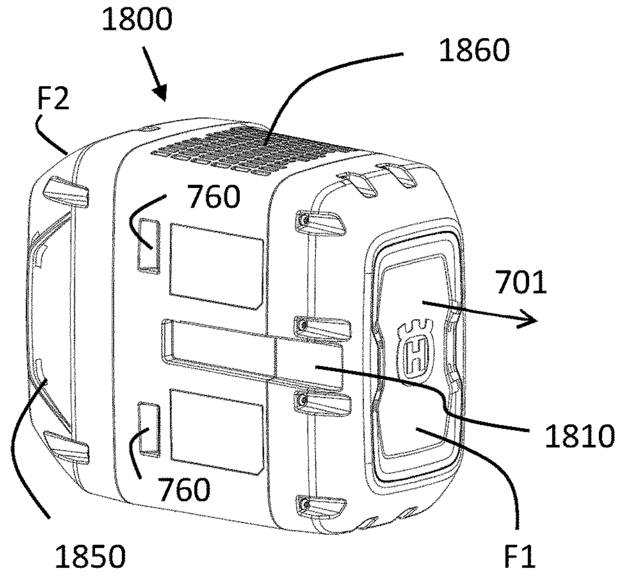
FIGS. 18A-C show a battery for insertion into a battery compartment.
Figure 18B:
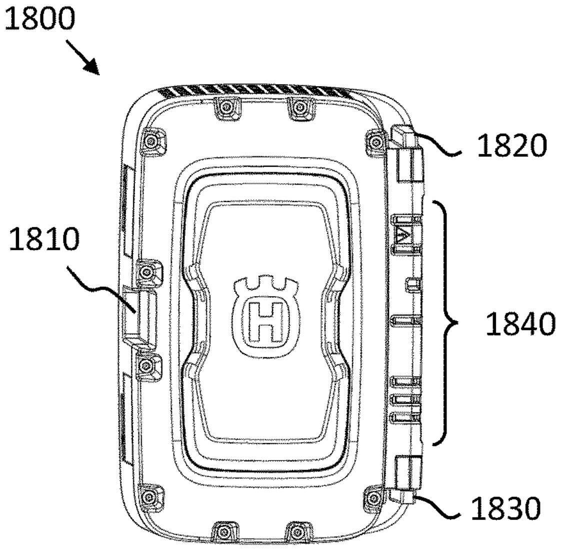
Figure 18C:
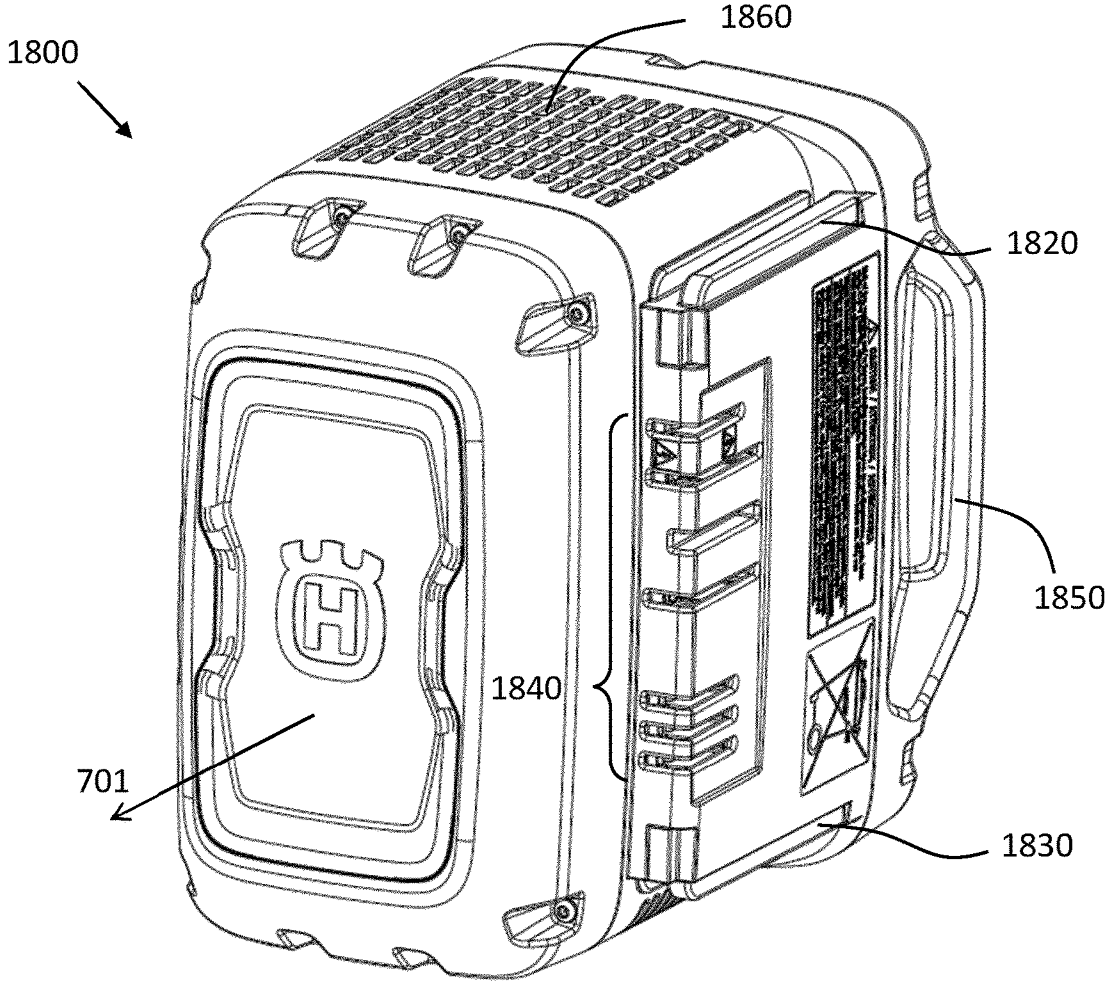

There is also disclosed herein a battery 1800 as shown in FIGS. 18A-C for insertion into the battery compartment 150. The battery 1800 has a weight between 3-7 kg and comprises a groove 1810 arranged on one side of the battery to mate with a corresponding supporting heel 1710 arranged on a wall of a battery compartment 150. The groove optionally has an initial bevel to simplify mating with the supporting heel 1710. The battery 1800 further comprises an upper ridge structure 1810 and a lower ridge structure 1820 on an opposite side of the battery compared to the groove 1810, as shown in FIG. 18, for mating with corresponding dove-tail grooves 1720, 1730 of the battery compartment 150. Thus, the battery 1800 is configured for insertion into the battery compartment 150 discussed in connection to FIGS. 17A and 17B.

The battery 1800 comprises at least one recess 760 configured to receive a respective locking member 710 of a battery lock mechanism 700 as discussed above. The locking member comprises a leading edge portion 750 with an arcuate form and the recess 760 comprises a surface 770 arranged to engage the leading edge portion 750. The surface 770 has an arcuate form to match that of the leading edge portion 750. Two recesses are advantageously arranged on either side of the elongated supporting heel 1710 as shown in FIG. 18A.

The battery 1800 exemplified in FIGS. 18A-C also comprises one or more electrical connectors 1840 arranged protected in slots extending in the insertion direction to mate with corresponding contact strips 1740 arranged in the battery compartment 150.

Optionally, the battery 1800 comprises a forward face F1 facing in the insertion direction 701 when the battery 1800 is inserted in the battery compartment 150, and a rearward face F2 opposite to the forward face, wherein the rearward face is formed as a handle 1850 to allow gripping by one hand.

The battery also comprises electrical connectors 1840 configured in slots extending in the insertion direction to mate with corresponding contact strips 1740 arranged in the battery compartment 150. The electrical connectors are thereby protected from mechanical impact.

To promote cooling of the battery, there is an air inlet arranged on a bottom side of the battery which is in fluid communication with an air outlet 1860 arranged on the upper side of the battery, as seen in FIG. 18C. Thus, the air stream 160 from the fan 145 can be guided through the battery 1800 to better cool the battery cells.

The battery and the battery compartments discussed in connection to FIGS. 17 and 18 can also be used with other handheld tools. Thus, the features disclosed in connection to the battery compartment and battery are not dependent on any other particular features of the tools discussed herein.

The invention claimed is:

1. A hand-held work tool comprising:

a first part; and a second part;

wherein the first part comprises an interface for holding a cutting tool and an electric motor arranged to drive the cutting tool, wherein the electric motor is arranged to drive a fan configured to generate a flow of cooling air for cooling the electric motor;

wherein the second part comprises a battery compartment for holding an electrical storage device arranged to power the electric motor;

wherein the hand-held work tool further comprises a cooling air conduit arranged to guide a portion of the flow of cooling air from the first part and into the second part for cooling the electrical storage device, wherein the portion of the flow of cooling air guided from the first part and into the second part passes via a bellows arranged in-between the first and the second parts, and wherein the bellows surround the cooling air conduit and make up interior walls of the cooling air conduit.

2. The hand-held work tool according to claim 1, wherein the first part is vibrationally isolated from the second part by one or more resilient elements.

3. The hand-held work tool according to claim 1, wherein the flow of cooling air for cooling the electric motor extends transversally through the hand-held work tool, with respect to an extension plane of the cutting tool.

4. The hand-held work tool (100, 200, 800, 1000) according to claim 1, wherein the portion of the flow of cooling air guided from the first part and into the second part passes via the bellows;

wherein the bellows is associated with a Shore durometer value, or Shore hardness, between 10-70, and preferably between 50-60, measured with durometer type A according to DIN ISO 7619-1.

5. The hand-held work tool according to claim 1, wherein the portion of the flow of cooling air guided from the first part and into the second part passes via the bellows;

wherein the bellows comprises a poka-yoke feature, the poka-yoke feature comprising at least one protrusion configured to enter a corresponding recess formed in the first part or in the second part, thereby preventing erroneous assembly of the bellows with the first and second parts.

6. The hand-held work tool according to claim 1, wherein the portion of the flow of cooling air guided from the first part and into the second part passes via the bellows;

wherein the bellows comprises at least one edge portion of increased thickness, wherein each edge portion is arranged to enter a corresponding groove formed in the first part or in the second part, thereby fixing the bellows in relation to the first or second part.

7. The hand-held work tool according to claim 6, wherein the bellows is arranged with a shape that is symmetric about a symmetry plane parallel to an extension direction of the at least one edge portion.

8. The hand-held work tool according to claim 1, wherein the portion of the flow of cooling air from the first part and into the second part is arranged to pass a control unit of the hand-held work tool.

9. The hand-held work tool according to claim 1, wherein the first part comprises a belt guard configured to enclose an interior space, wherein a second portion of the flow of cooling air is arranged to be guided into the interior space, thereby increasing an air pressure in the belt guard interior space above an ambient air pressure level.

10. The hand-held work tool according to claim 1, wherein the portion of the flow of cooling air from the first part and into the second part is initially directed downwards in the tool, where downwards is a direction from the fan towards ground when the tool is supported by a ground support member.

11. The hand-held work tool according to claim 1, wherein the portion of the flow of cooling air from the first part and into the second part is initially directed downwards in the tool, where downwards is a direction from the fan towards ground when the tool is supported by a ground support member, then directed backwards in the tool, where backwards is a direction from the fan towards the rear handle, and finally upwards in the tool, where upwards is a direction opposite to the downwards direction.

12. The hand-held work tool according to claim 1, wherein the portion of the flow of cooling air from the first part and into the second part is initially directed backwards in the tool, where backwards is a direction from the fan towards the rear handle.

13. The hand-held work tool according to claim 1, wherein the portion of the flow of cooling air from the first part and into the second part is arranged to enter the electrical energy source via a third outlet arranged inside the battery compartment.

14. The hand-held work tool according to claim 1, wherein the first part comprises a thermally conductive support arm arranged to support the circular cutting tool on a first end of the support arm and to support the electric motor by a support surface at a second end of the support arm opposite to the first end, wherein the support arm comprises one or more cooling flanges arranged to conduct heat away from the electric motor via the support surface.

15. The hand-held work tool according to claim 14, wherein the support arm is arranged to at least partially enclose a motor housing of the electric motor to form a slot around the motor housing, thereby guiding a second flow of cooling air for cooling the electric motor.

16. The hand-held work tool according to claim 14, wherein the support arm and the electric motor are at least partially integrally formed.

17. The hand-held work tool according to any of claim 14, wherein at least 20% of a volume of the electric motor housing is enclosed by the support arm, or at least 20% of the motor axle length is enclosed by the support arm.

18. The hand-held work tool according to claim 1, wherein the fan extends in a plane perpendicular to an axis of rotation of the fan, the fan comprising an axial fan portion arranged radially outwards from a radial fan portion arranged centrally on the fan with respect to the axis of rotation, wherein the axial fan portion is arranged to generate the flow of cooling air for cooling the electric motor, and wherein the radial fan portion is arranged to generate the portion of the flow of cooling air from the first part and into the second part for cooling the electrical storage device.

19. The hand-held work tool according to claim 1 wherein the battery compartment comprises a wall, wherein an elongated supporting heel is mounted on the wall, the supporting heel extending in an elongation direction transversal to the work tool and in an insertion direction of a battery in the battery compartment, wherein the supporting heel is arranged to support the battery received in the battery compartment against gravity.

20. The hand-held work tool according to claim 19, wherein the supporting heel is metal shod.

21. The hand-held work tool according to claim 19, wherein the battery compartment further comprises an upper dove-tail groove or a lower dove-tail groove arranged on the wall or another wall of the battery compartment to support the battery received in the battery compartment, wherein the upper and lower dove-tail grooves are arranged to mate with corresponding ridge structures on the battery, such that the battery can be inserted into the battery compartment in a mating position with the dove-tail grooves.

22. A fan for a hand-held work tool, the fan extending in a plane perpendicular to an axis of rotation of the fan, the fan comprising:

an axial fan portion arranged radially outwards from a radial fan portion arranged centrally on the fan with respect to the axis of rotation, wherein the axial fan portion comprises a first set of fan blades and is arranged to generate a first flow of cooling air for cooling a first hand-held work tool member, wherein the radial fan portion comprises a second set of fan blades and is arranged to generate a second flow of cooling air for cooling a second hand-held work tool member, wherein the fan guides a portion of the flow of cooling air from a first part and into a second part through a cooling air conduit for cooling an electrical storage device, wherein the portion of the flow of cooling air guided from the first part and into the second part passes via a bellows arranged in-between the first and the second parts, and wherein the bellows surround the cooling air conduit and make up interior walls of the cooling air conduit.

23. A hand-held work tool comprising:

a first part; and a second part;

wherein the first part and the second part are arranged vibrationally isolated from each other, wherein the first part comprises an interface for holding a cutting tool and an electric motor arranged to drive the cutting tool, wherein the electric motor is arranged to drive a fan configured to generate a flow of cooling air for cooling the electric motor;

wherein the second part comprises a handle, a control unit including control electronics, and battery compartment for holding an electrical storage device arranged to power the electric motor;

wherein the hand-held work tool further comprises a cooling air conduit arranged to guide a portion of the flow of cooling air from the first part and into the second part for cooling the electrical storage device, wherein the portion of the flow of cooling air guided from the first part and into the second part passes via a bellows arranged in-between the first and the second parts, and wherein the bellows surround the cooling air conduit and make up interior walls of the cooling air conduit.

* * * * *